(12) United States Patent
Sase et al.

(10) Patent No.: US 7,990,122 B2
(45) Date of Patent: Aug. 2, 2011

(54) DIGITAL CONTROL SWITCHING POWER-SUPPLY DEVICE AND INFORMATION PROCESSING EQUIPMENT

(75) Inventors: Takashi Sase, Hitachi (JP); Yosuke Kawakubo, Odawara (JP)

(73) Assignee: Hitachi, Ltd., Tokyo (JP)

( * ) Notice: Subject to any disclaimer, the term of this patent is extended or adjusted under 35 U.S.C. 154(b) by 802 days.

(21) Appl. No.: 11/853,916

(22) Filed: Sep. 12, 2007

(65) Prior Publication Data

US 2008/0252277 A1 Oct. 16, 2008

(30) Foreign Application Priority Data

Oct. 2, 2006 (JP) .................................. 2006-271082
Aug. 1, 2007 (JP) .................................. 2007-201087

(51) Int. Cl.
*G05F 1/575* (2006.01)
(52) U.S. Cl. ........................................ 323/283; 323/284
(58) Field of Classification Search .................. 323/283, 323/282, 284–285, 223, 272
See application file for complete search history.

(56) References Cited

U.S. PATENT DOCUMENTS

| 5,594,631 | A | * | 1/1997 | Katoozi et al. | ................... | 363/41 |
| 6,965,502 | B2 | * | 11/2005 | Duffy et al. | ..................... | 361/18 |
| 2003/0231010 | A1 | * | 12/2003 | Sase et al. | ..................... | 323/282 |
| 2006/0043954 | A1 | * | 3/2006 | Markowski | ................... | 323/283 |
| 2006/0055388 | A1 | * | 3/2006 | Tang et al. | ..................... | 323/284 |

FOREIGN PATENT DOCUMENTS

JP 2003-061351 2/2003

* cited by examiner

*Primary Examiner* — Harry Behm
(74) *Attorney, Agent, or Firm* — Antonelli, Terry, Stout & Kraus, LLP.

(57) ABSTRACT

To provide a digital control switching power-supply device capable of suitably achieving fast transient response at the time of a sudden load change. In parallel with normal digital signal processing means that outputs a PWM pulse signal having a desired duty, transient variation detection means composed of a CR filter provided across an output inductor and a window comparator is provided in preparation for a sudden load change. If a sudden decrease in load is detected, a PWM pulse signal having a duty of 0% is forcedly output, and if a sudden increase in load is detected, a PWM pulse signal having a duty of 100% is forcedly output.

17 Claims, 17 Drawing Sheets

| COMPARISON LEVEL | | $\alpha 0$ | $\alpha 100$ | PWM Duty |
|---|---|---|---|---|
| Vout | above Vref+Δ | L | L | 0% (SUDDEN DECREASE) |
| | between Vref+Δ and Vref−Δ | H | L | DESIRED α (STEADY) |
| | below Vref−Δ | H | H | 100% (SUDDEN INCREASE) |

DPWM

DPWM $Voref = (1 + (Rf + Rf\Delta)/(Ri + Ri\Delta))Vref$
$Ri\Delta = Rf\Delta$

DIGITAL CONTROL SWITCHING POWER-SUPPLY DEVICE AND INFORMATION PROCESSING EQUIPMENT

BACKGROUND OF THE INVENTION

1. Field of the Invention

The present invention relates to a digital control switching power-supply device for setting an output voltage at a reference voltage of a command signal and information processing equipment provided with the digital control switching power-supply device.

2. Background Art

As disclosed in the JP Patent Publication (Kokai) No. 2003-61351, when a conventional digital control switching power-supply device detects a sudden load change, it copes with the sudden load change by generating a sudden load change PWM pulse signal by switching a control gain of digital voltage control means, which corresponds to an analog control error amplifier.

SUMMARY OF THE INVENTION

According to the method described in the JP Patent Publication (Kokai) No. 2003-61351, a pair of power semiconductor switching components is driven under the control of digital voltage control means and a DPWM generator, which carry out digital signal processing. Since the digital signal processing is a sampling control system, the digital signal processing has a disadvantage that the processing speed is limited, and thus a significant output voltage variation occurs in response to a sudden load change that leads to a current change (di/dt) of several hundred A/µs or greater, and sufficiently fast transient response cannot be achieved.

In addition, in order to suppress the output voltage variation, a capacitor of an LC smoothing filter has to have a larger capacitance, and manufacturing a compact system or device at low cost becomes difficult because the number of external components increases.

The present invention has been made in view of such circumstances, and an object of the present invention is to provide a digital control switching power-supply device that uses a digital signal processing to generate a PWM pulse for setting the output voltage at a reference voltage of a command signal, in which fast transient response can be achieved while suppressing an output voltage variation at the time of a sudden load change even if the speed of the digital signal processing used is low.

In order to attain the object described above, according to the present invention, transient variation detection means is provided in preparation for a sudden load change, in addition to normal digital signal processing means, such as means for performing feed back control of a voltage signal. If a sudden load change occurs, the output voltage control can be performed without performing the digital signal processing, so that fast transient response can be achieved while suppressing an output voltage variation. Specifically, a digital control switching power-supply device according to the present invention comprises: a digital signal processing section having digital voltage control means that performs control so that the difference signal between a digital output voltage signal obtained by digitizing a fed-back output voltage of the switching power-supply device and a digital reference voltage signal obtained by digitizing a reference voltage of a command signal is zero and a digital pulse width modulation (DPWM) generator that generates a pulse width modulation (PWM) pulse signal; a pair of power semiconductor switching components driven by the PWM pulse signal; an LC smoothing filter that converts a square wave voltage resulting from switching of said pair of power semiconductor switching components into a direct current; transient variation detection means that detects a transient variation at the time of a sudden load change; and selection means that selects any of a PWM pulse signal having a desired duty generated by said DPWM generator and a PWM pulse signal having a preset fixed duty according to the result of detection by said transient variation detection means, and said pair of power semiconductor switching components is driven by the PWM pulse signal selected by said selection means.

In addition, said selection means selects a PWM pulse signal having a duty of 100% in a case where said transient variation detection means detects a sudden increases in load, selects a PWM pulse signal having a duty of 0% in a case where a sudden decrease in load is detected, and selects a PWM pulse having a desired duty generated by the DPWM generator in said digital signal processing section in other cases.

In addition, the transient variation detection means has a CR filter for transient variation detection provided across an inductor L of said LC smoothing filter and a transient variation detection circuit composed of a window comparator provided at an output terminal of the CR filter, said transient variation detection circuit compares an output voltage of said CR filter with upper and lower limit values preset around a reference voltage set to provide a desired output voltage of the digital control switching power-supply device in order to obtain detection information at the time of a sudden load change and supplies the comparison result to said selection means, and said selection means receives said comparison result as a selection signal and selects from among said PWM pulse signals based on said comparison result.

Furthermore, the digital control switching power-supply device according to the present invention can be configured to perform a multi-phase operation. Specifically, a power-supply device according to the present invention is a digital control switching power-supply device having a plural number of power supply units, in which each power supply unit comprises: a digital signal processing section having digital voltage control means that performs control so that the difference signal between a digital output voltage signal obtained by digitizing a fed-back output voltage of the switching power-supply device and a digital reference voltage signal obtained by digitizing a reference voltage of a command signal is zero and a digital pulse width modulation (DPWM) generator that generates a pulse width modulation (PWM) pulse signal; a pair of power semiconductor switching components driven by the PWM pulse signal; an LC smoothing filter that converts a square wave voltage resulting from switching of said pair of power semiconductor switching components into a direct current; transient variation detection means that detects a transient variation at the time of a sudden load change; and selection means that selects any of a PWM pulse signal having a desired duty generated by said DPWM generator and a PWM pulse signal having a preset fixed duty according to the result of detection by said transient variation detection means, said pair of power semiconductor switching components is driven by the PWM pulse signal selected by said selection means, and a common output capacitor is shared by said LC smoothing filters of said plural number of power supply units.

The digital control switching power-supply device according to the present invention can be applied to information processing equipment, such as a HDD. Furthermore, the power-supply device can be implemented as an IC and incorporated in a package of a semiconductor chip such as CPU and a memory or can be incorporated in a semiconductor chip such as CPU and a memory.

Further features of the present invention will be apparent from the detailed description of the preferred embodiments and the accompanying drawings.

According to the present invention, there can be provided a digital control switching power-supply device that can achieve fast transient response while suppressing an output voltage variation at the time of a sudden load change even if the speed of the digital signal processing for voltage control is low.

DETAILED DESCRIPTION OF THE PREFERRED EMBODIMENTS

A digital control switching power-supply device according to the present invention has transient variation detection means, which is provided in parallel with a normal digital signal processing system, and thereby allows fast transient response of a power-supply device for a buck-type DC/DC converter to a sudden load change. In addition, the digital control switching power-supply device allows multi-phase operation or parallel operation of a plurality of power-supply devices.

Transient variation detection in response to a sudden load change can be conducted in various ways. In the following, embodiments of the present invention will be described with reference to the drawings. The digital control described in the following embodiments is based on the sampling processing, and therefore, a sampling circuit and a hold circuit, which are inherent in that processing, are used. However, the following embodiments are intended for illustration of the power supply control operation, and thus, illustration and description of the circuits associated with the sampling processing will be omitted.

First Embodiment

Figures 1, 2:
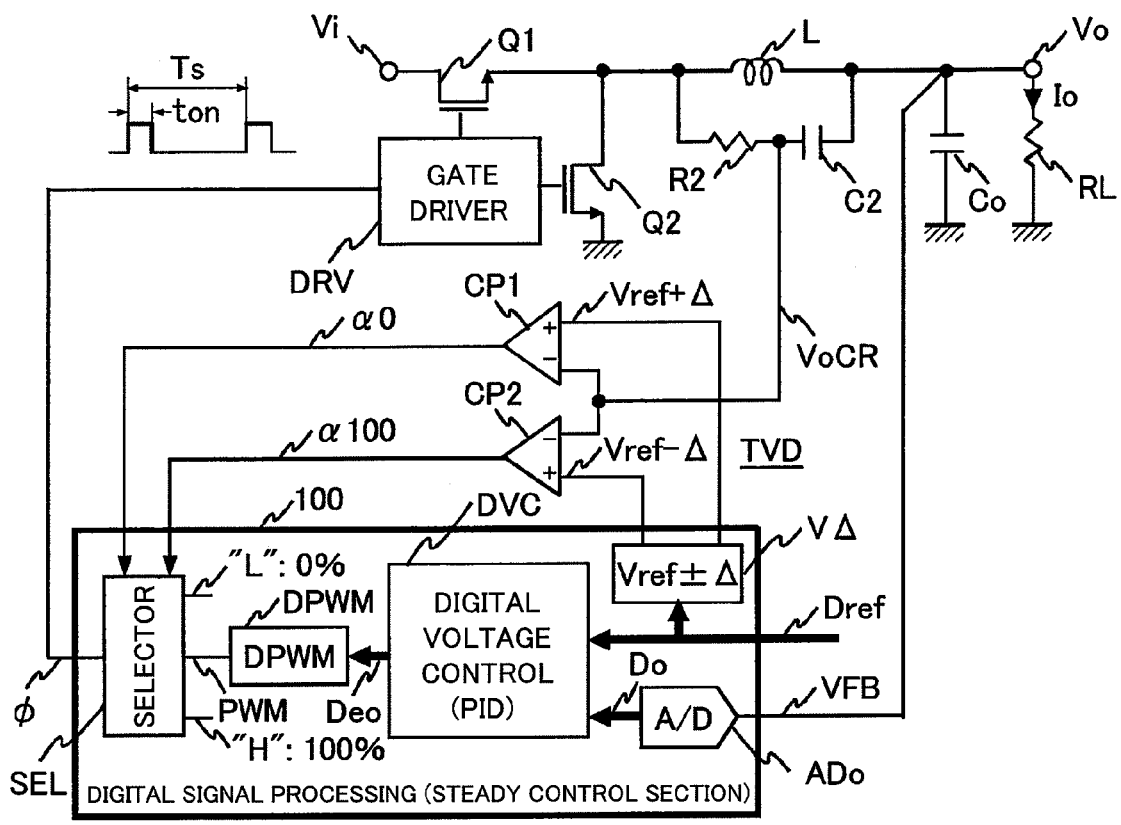
FIG. 1 is a circuit block diagram showing a configuration of a digital control switching power-supply device according to a first embodiment of the present invention.
FIG. 2 is a diagram showing an operating state transition of the power-supply device shown in FIG. 1.

FIG. 1 is a diagram showing a circuit configuration of a digital control switching power-supply device according to a first embodiment. In FIG. 1, reference character Vi denotes an input terminal, and reference character Vo denotes an output terminal. A high-side power MOSFET Q1 is connected to the input terminal Vi, and a low-side power MOSFET Q2 is connected to the ground. An LC smoothing filter, which is a power system output filter composed of an inductor L and a capacitor Co, and a CR filter composed of a resistor R2 and a capacitor C2 are connected to a midpoint between the power MOSFETs Q1 and Q2 at one ends thereof. The other end of the CR filter composed of the resistor R2 and the capacitor C2 and the output terminal Vo are connected to a midpoint of the LC smoothing filter, and a digital voltage control means DVC is also connected to the midpoint of the LC smoothing filter via an A/D converter ADo in a digital signal processing section 100. The capacitor Co of the LC smoothing filter is a chip ceramic capacitor. Furthermore, although the inductor L has an equivalent series resistance (abbreviated as ESR), the equivalent series resistance is omitted in this drawing.

A digital reference voltage signal Dref, which is a digitized reference voltage, is supplied to the digital voltage control means DVC in the digital signal processing section 100. The gates of the power MOSFETs Q1 and Q2 are connected to the output of the digital voltage control means DVC via a digital pulse width modulation (DPWM) generator DPWM, a selector SEL and a gate driver DRV. The power MOSFETs Q1 and Q2 are driven in opposite phase and alternately made conductive. The digital voltage control means DVC in the digital signal processing section 100 and the DPWM generator DPWM essentially correspond to an error amplifier and a PWM oscillator in the case of analog control, respectively.

In addition, negative inputs (−) of two comparators CP1 and CP2 arranged in a window comparator configuration are connected to a midpoint of the CR filter composed of the resistor R2 and the capacitor C2. As shown in FIG. 1, two outputs Vref+Δ and Vref−Δ of a (Vref±Δ) generating circuit are supplied to positive inputs (+) of the two comparators CP1 and CP2, respectively. In addition, outputs α0 and α100 of the comparators CP1 and CP2 are supplied to the selector SEL. The selector SEL selects a PWM pulse signal having a PWM duty shown in FIG. 2 according to the operating state of the output signals α0 and α100 of the comparators CP1 and CP2.

Now, an operation of the circuit shown in FIG. 1 will be described. During a steady operation of a buck-type converter, the outputs α0 and α100 of the two comparators CP1 and CP2 are set at "High" and "Low", respectively (see FIG. 2), and in this state, the selector SEL selects the output of the DPWM generator DPWM in the digital signal processing section 100. In this case, the input voltage applied to the input terminal Vi is converted into a direct-current voltage by the LC smoothing filter L, Co through on-off control of the high-side power MOSFET Q1 and the low-side power MOSFET Q2. The converted voltage VFB is converted into a digital output voltage signal Do by the A/D converter ADo, calculation of the resulting digital output voltage signal Do and the digital reference voltage signal Dref is performed by the digital voltage control means DVC, and the digital voltage control means DVC outputs a digital voltage control output signal Deo that is calculated so that an actuating error between the digital output voltage signal Do and the digital reference voltage signal Dref is eliminated.

The digital voltage control output signal Deo is converted into a PWM pulse signal by the DPWM generator DPWM, and the PWM pulse signal is converted by the selector SEL and the gate driver DRV into an on-off time ratio (duty α), which is a ratio between the on time and the off time of the high-side power MOSFET Q1 and the low-side power MOSFET Q2. The on-off time ratio is converted into the converted voltage VFB as the output of the LC smoothing filter L, Co, and the converted voltage VFB is fed back to the digital voltage control means DVC. As a result, the converted voltage VFB becomes equal to a reference voltage Vref, which is the digital reference voltage signal Dref converted into an analog value. In this case, in a steady state, the converted voltage VFB obtained through the LC smoothing filter L, Co, that is, an output voltage Vout obtained at the output terminal Vo, is proportional to the duty α of an input voltage Vin applied to the input terminal Vi.

Therefore, the following relation holds: Vout=VFB=Vref=α*Vin. Since the duty α is defined as the on time divided by the sum of the on time and the off time (on time/(on time+off time)), the duty assumes a value between 0 and 1. Furthermore, since the duty α is equal to the voltage conversion ratio, the duty can be expressed by the ratio between the output voltage Vout and the input voltage Vin (Vout/Vin). Therefore, at the output of the LC smoothing filter L, Co, that is, at the output terminal Vo, a desired voltage proportional to the duty α of the input voltage Vin is obtained as the output voltage Vout. As the digital signal processing used for the steady control, the general-purpose digital PID control or digital arithmetic processing can be directly applied. In the steady control, PWM pulse signals are normally generated at the operating period (switching period) of the DPWM generator DPWM.

Now, there will be described an operation in the case where a sudden load change occurs (the sudden load change may be a sudden load increase or a sudden load decrease), such as the case where the amount of arithmetic operation of a processor (CPU), which is a load on the power supply, suddenly increases (a sudden load increase). In case of the sudden load decrease, the output voltage Vout suddenly increases, and the sudden increase in output voltage is immediately reflected in the output voltage VoCR of the CR filter composed of the resistor R2 and the capacitor C2. When the voltage VoCR exceeds the voltage level Vref+Δ, the output α0 of the comparator CP1 is switched from "High" to "Low". As a result, the selector SEL selects a PWM pulse signal corresponding to the duty of 0% and outputs the PWM pulse signal to the gate driver circuit DRV. As a result, the low-side power MOSFET Q2 is forced into the on state (during this period, the high-side power MOSFET Q1 is in the off state), thereby rapidly decreasing the output voltage Vout and thus substantially suppressing the output voltage variation.

On the other hand, in case of the sudden load increase, the output voltage Vout suddenly decreases, and the sudden decrease in output voltage is immediately reflected in the output voltage VoCR of the CR filter composed of the resistor R2 and the capacitor C2. When the voltage VoCR becomes lower than the voltage level Vref−Δ, the output α100 of the comparator CP2 is switched from "Low" to "High". As a result, the selector SEL selects a PWM pulse signal corresponding to the duty of 100% and outputs the PWM pulse signal to the gate driver circuit DRV. As a result, the high-side power MOSFET Q1 is forced into the on state (during this period, the low-side power MOSFET Q2 is in the off state), thereby rapidly increasing the output voltage Vout and thus substantially suppressing the output voltage variation.

Figure 3:
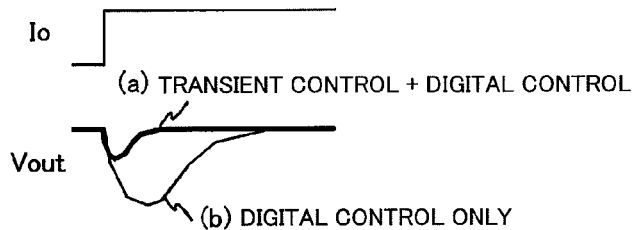
FIG. 3 is a diagram showing an output response waveform of the power-supply device shown in FIG. 1 at the time of sudden load increase.

In case of the sudden load increase, for example, the transient control by the transient variation detection means quickly substantially reduce the variation in output voltage Vout in the fast transient response, as shown by the response characteristics (a) in FIG. 3. Comparing this effect with the normal digital control shown by the response characteristics (b) in FIG. 3 in which the steady control and the transient control are achieved only by the digital signal processing, it is obvious that the output voltage variation can be more remarkably reduced.

The digital control system according to the first embodiment is characterized in that, when a sudden load change occurs, the transient control operation is forcedly performed by the transient variation detection means, which is provided as another processing route, independently of the normal digital signal processing operation, so that the control can be achieved in response to the sudden load change without delay, and fast transient response can be achieved.

In addition, since only the transient control by the transient variation detection means is responsible for the fast transient response, the normal steady control operation does not require a fast digital signal processing, so that low-speed and inexpensive DSP core, A/D converter and the like can be used. Thus, the cost of the device and the system can be reduced.

Furthermore, the power-supply device according to the first embodiment can achieve a switching operation not only at a frequency of 1 MHz or lower but also at a high frequency of several hundred MHz only if the transient variation detection means that performs the transient control is designed for the fast operation. As a result of the speed improvement, the size of the power-supply device can be reduced, the power-supply device can be disposed close to the load as with POL and VRM, and furthermore, the power-supply device can be implemented as an on-chip component of a load, such as a processor (CPU) chip and ASIC. The circuit constants of the CR filter composed of the resistor R2 and the capacitor C2 are about 10 kΩ and 10 nF for the operation at 1 MHz, since the CR filter is to detect the variation in load current. However, if the variation in load current is not changed even if the switching frequency is raised by one order of magnitude, similar fast transient response can be achieved with the substantially identical circuit constants.

In the first embodiment described above, a DSP core is used as the digital signal processing section 100. However, alternatively, a processor (CPU), special purpose hardware (including FPGA) or the like can be used.

Furthermore, in the first embodiment, the digital reference voltage signal Dref is a digitized reference voltage Vref. However, the reference voltage Vref generated using a bandgap reference can be used. In this case, in order to use the reference voltage Vref for the digital signal processing, the reference voltage Vref has to be converted into the digital reference voltage signal Dref by an A/D converter.

Furthermore, in the first embodiment described above, the digital signal processing section 100 is composed of the digital voltage control means DVC and the digital PWM generator DPWM. However, the digital signal processing section 100 may be composed only of the digital voltage control means DVC, and the digital PWM generator DPWM may be provided separately.

Figure 4:
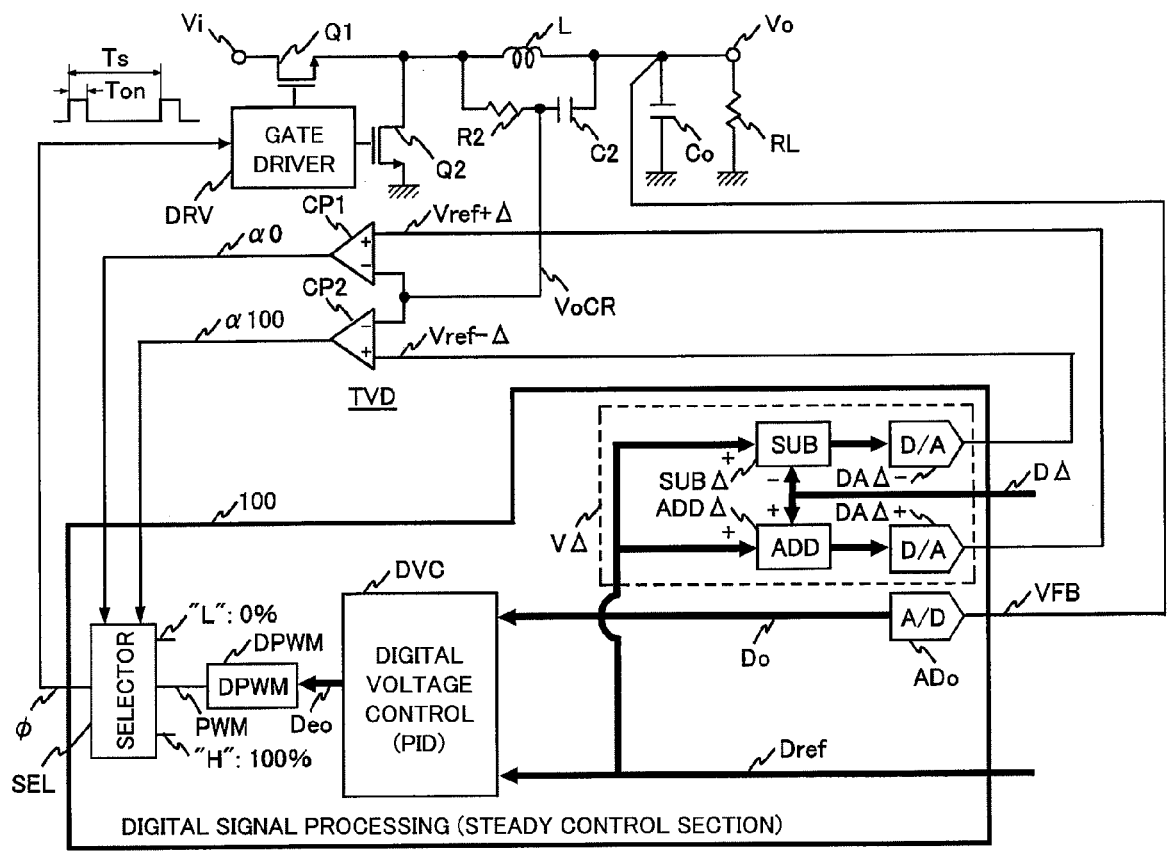
FIG. 4 is a block diagram of the power-supply device shown in FIG. 1 in which a (Vref±Δ) generating circuit is specifically shown.

Now, the digital signal processing will be described with reference to FIG. 4 in which the (Vref±Δ) generating circuit VΔ shown in FIG. 1 is specifically shown. In FIG. 4, the same components as those in FIG. 1 are denoted by the same reference characters. An output voltage Vref+Δ of the (Vref±Δ) generating circuit VΔ is obtained by summing the digital reference voltage signal Dref and a digital transient variation detection width signal DΔ in an adder ADDΔ and then converting the sum into an analog form by a D/A converter DAΔ+. An output voltage Vref−Δ of the (Vref±Δ) generating circuit VΔ is obtained by performing subtraction between the digital reference voltage signal Dref and the digital transient variation detection width signal DΔ in a subtracter SUBΔ and then converting the difference into an analog form by a D/A converter DAΔ−.

In the circuit shown in FIG. 4, the digital transient variation detection width signal DΔ is externally set as digital data as with the digital reference voltage value Dref. However, if only setting fixed data suffices, the digital transient variation detection width signal DΔ can be previously set in the digital signal processing section 100 as digital data. Alternatively, the digital transient variation detection width signal DΔ may be produced by A/D-converting an analog signal. Furthermore, while the upper limit value and the lower limit value of the transient variation detection width Δ are equal in magnitude in the above description, the upper limit value and the lower limit value may not be always equal in magnitude and may be different in magnitude.

Second Embodiment

Figure 5:
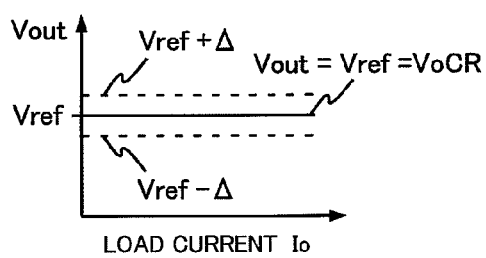
FIG. 5 is a diagram showing the output voltage versus the load current of the power-supply device shown in FIG. 1.
Figure 6:
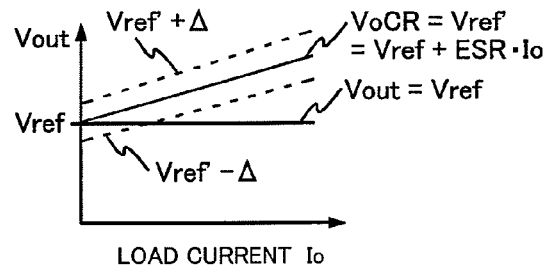
FIG. 6 is a diagram showing the effect of an ESR of an output inductor in the first embodiment.

For easy understanding of the operation of the power supply, in the first embodiment described above, the transient variation detection width Δ is centered around the reference voltage Vref. Therefore, as shown in FIG. 5, the relationship between the output voltage Vout at the output terminal Vo and the output voltage VoCR of the CR filter for transient variation detection is fixed independently of the magnitude of the load current Io. Since the inductor L actually has an equivalent series resistance (ESR) (not shown), the output voltage VoCR tends to increase as the load current Io increases as shown in FIG. 6, while the output voltage Vout is controlled to be a fixed value. Thus, it is necessary that the transient variation detection width Δ is set taking into account the output voltage VoCR of the CR filter, which is a ramp voltage.

It is known that the ramp output voltage VoCR of the CR filter is expressed as ESR* Io. In actual, however, the ramp voltage cannot be directly detected. Instead, the ramp voltage is determined as a difference voltage between the output voltage VoCR of the CR filter and the output voltage Vout.

Thus, according to a second embodiment, the difference voltage is added to the reference voltage Vref, thereby obtaining a ramp, new reference voltage Vref (=Vref+ ESR*Io=Vref+VoCR−Vout). In the following, with reference to FIG. 7, there will be described a circuit configuration that is implemented to generate the new reference voltage Vref.

Figure 7:
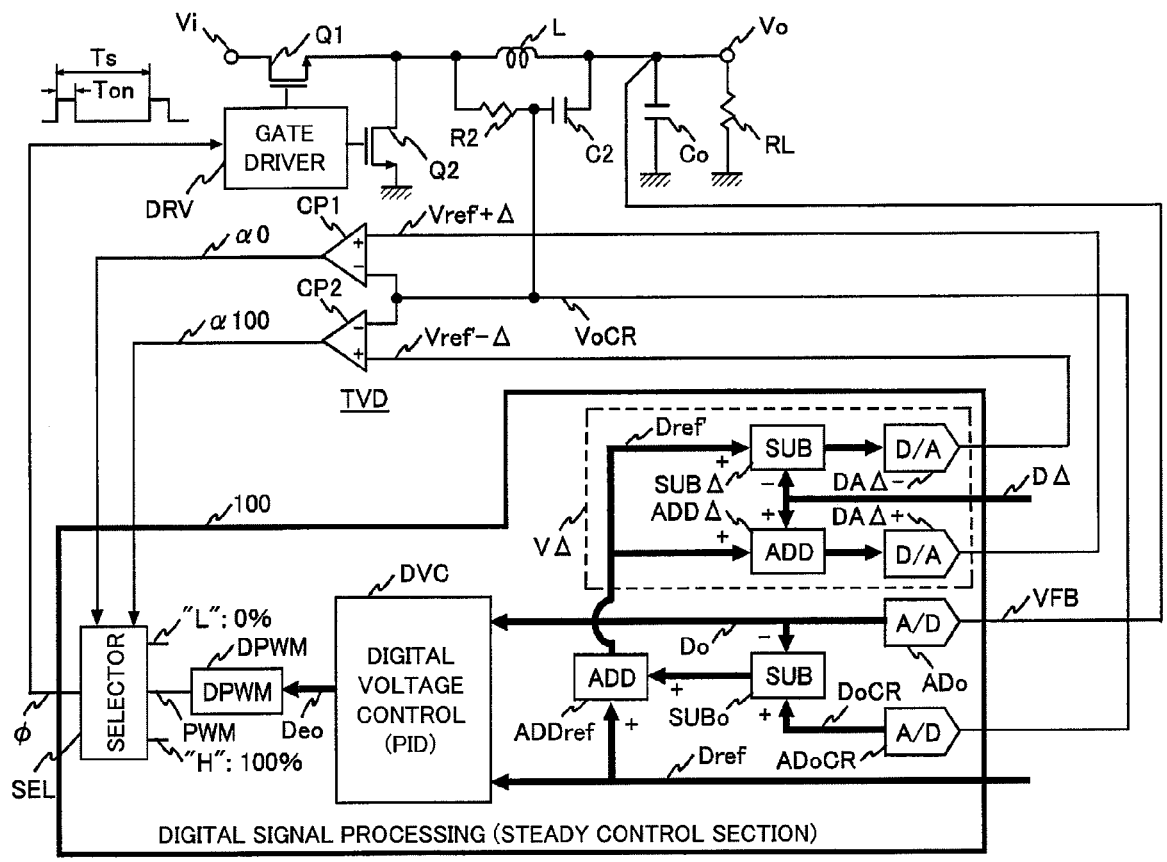
FIG. 7 is a circuit block diagram showing a digital control switching power-supply device according to a second embodiment, in which the (Vref±Δ) generating circuit shown in FIG. 4 is improved.

In FIG. 7, in the digital signal processing for determining the value (Vref+VoCR−Vout), first, the digital signal (VOCR−Vout) is determined by subtracting, in a subtracter SUBo, a digital output voltage signal Do obtained by converting the converted voltage VFB (corresponding to the output voltage Vout) by the A/D converter ADo from a digital signal DoCR obtained by converting the output voltage VoCR of the CR filter by an A/D converter ADoCR.

Then, the digital signal obtained by the subtraction and the digital reference voltage signal Dref are added to each other by an adder ADDref, thereby determining a new digital reference voltage signal Dref. The new digital reference voltage signal Dref is used as an input to the (Vref±Δ) generating circuit VΔ, and the (Vref±Δ) generating circuit VΔ generates Vref'±Δ newly as an output voltage. If the Vref'±Δ is used to detect the transient variation, a fixed transient variation detection width Δ can be always provided independently of the output voltage VoCR of the CR filter, so that the detection sensitivity can be kept constant independently of the load current Io. Thus, optimal transient variation detection processing can be achieved.

As described above, the second embodiment has an advantage that the voltage drop depending on the load current due to the ESR of the inductor L can be compensated for, thereby making the output voltage stable and fixed.

In the second embodiment, the arithmetic operation including addition and subtraction for determining the new reference voltage is performed by means of hardware. However, of course, this processing algorithm can also be performed by means of software.

Third Embodiment

Figure 8:
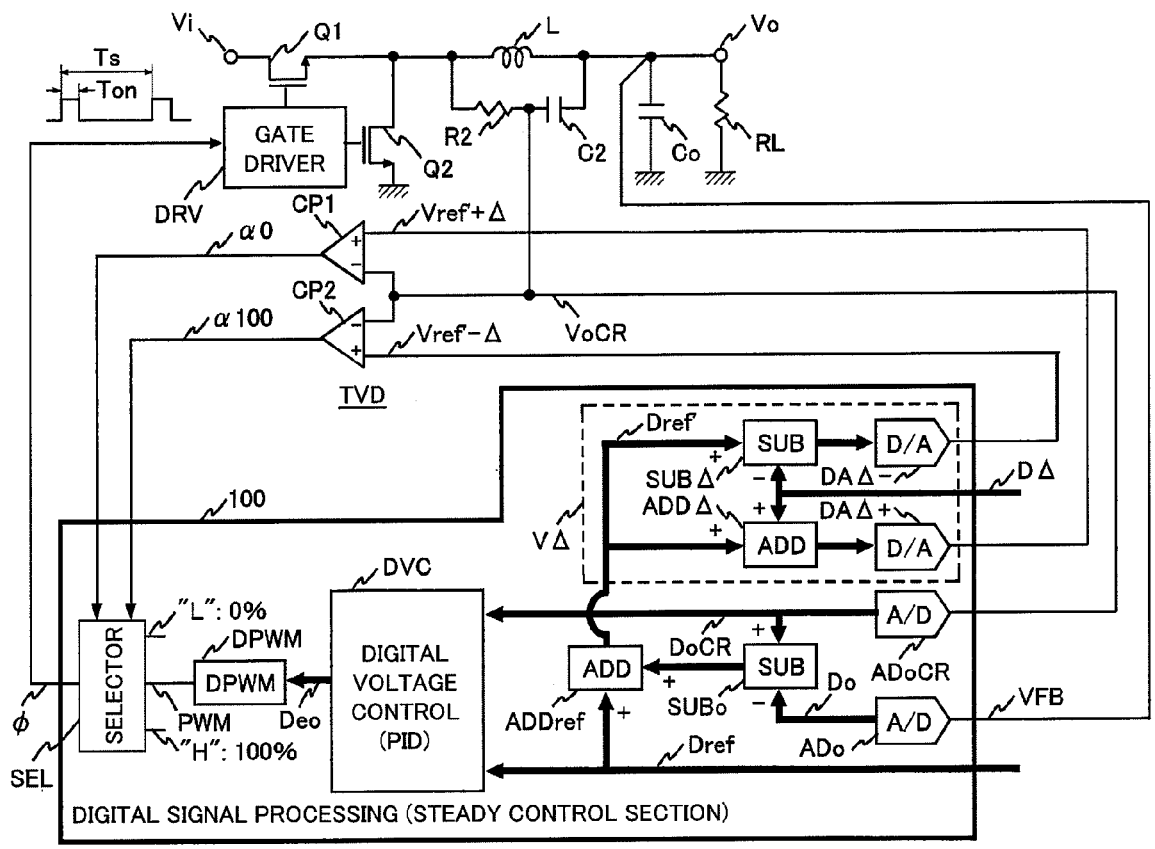
FIG. 8 is a circuit block diagram showing a configuration of a digital control switching power-supply device according to a third embodiment of the present invention.
Figure 9:
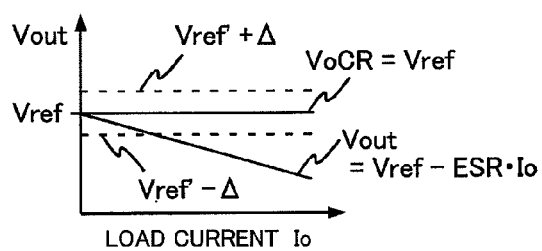
FIG. 9 is a diagram showing the effect of an ESR of an output inductor shown in FIG. 8.

With reference to FIG. 8, a third embodiment will be described. FIG. 8 shows a circuit configuration in which the digital voltage control means DVC performs the arithmetic operation using the digital reference voltage signal Dref and a signal obtained by digitizing the output voltage VoCR of the CR filter for transient variation detection. The circuit configuration shown in FIG. 8 differs from that shown in FIG. 7 in that, instead of the output voltage Vout at the output terminal Vo, the output voltage VoCR of the CR filter is under the fixed value control to be used as the reference voltage Vref. As shown in FIG. 9, as the load current Io increases, the output voltage Vout decreases. This is an implementation of functions referred to as active droop and active voltage positioning, which use the ESR of the inductor L.

According to the third embodiment described above, fast transient response or the like can be achieved as in the embodiments described earlier. In addition, since the voltage VoCR is used, the order of the filter is reduced, and phase compensation control can be more easily performed.

Fourth Embodiment

Figure 10:
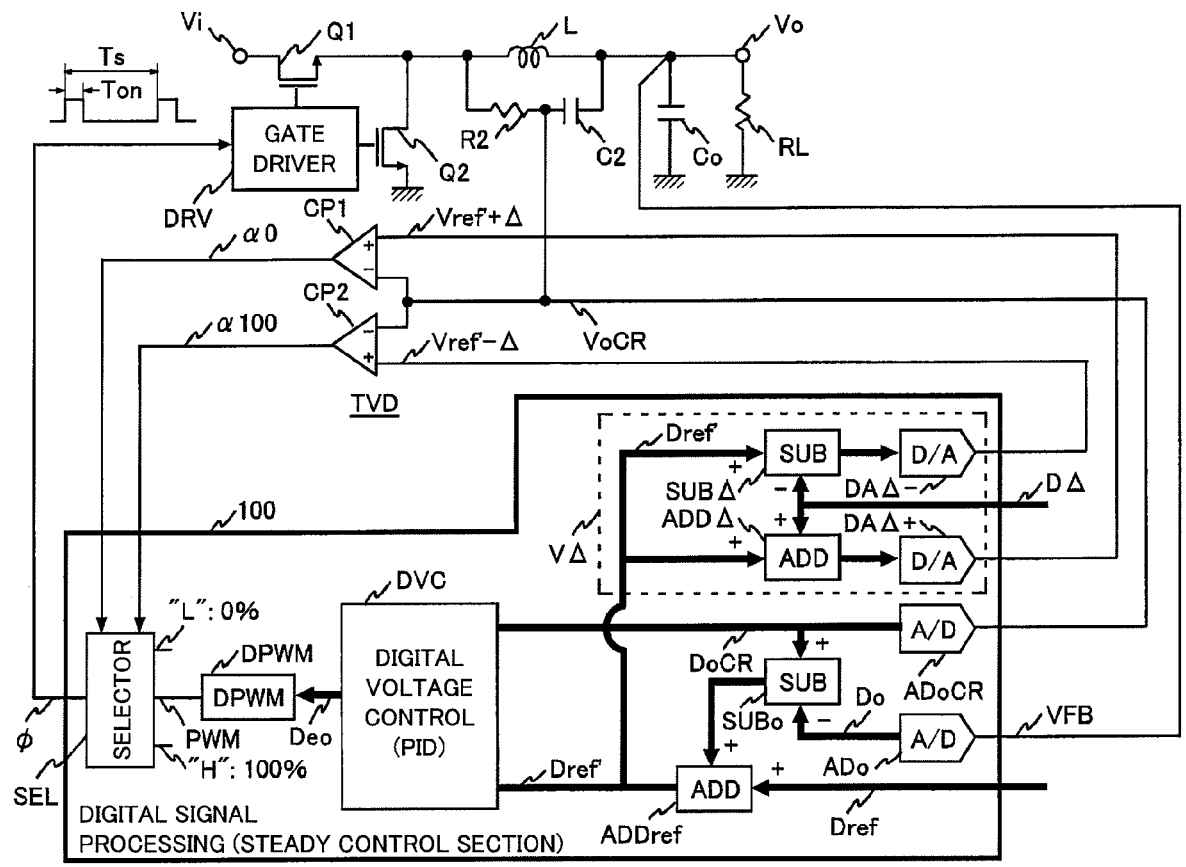
FIG. 10 is a circuit block diagram showing a digital control switching power-supply device according to a fourth embodiment of the present invention, in which output regulation compensation shown in FIG. 8 is implemented.

With reference to FIG. 10, a fourth embodiment will be described. FIG. 10 shows a circuit configuration for making the output voltage Vout at the output terminal Vo equal to the reference voltage Vref while the output voltage VoCR of the CR filter is being controlled. The circuit configuration shown in FIG. 10 differs from that shown in FIG. 8 in that, instead of the digital reference voltage signal Dref, the output signal Dref' of the adder ADDref is used for the arithmetic operation of the digital voltage control means DVC.

In this case, the output voltage VoCR of the CR filter is controlled according to the formula (VoCR=Vref+ESR*Io) rather than the formula (VoCR=Vref). Therefore, the output voltage Vout shown in FIG. 6 is kept constant and equals to the reference voltage Vref independently of the load current Io. In the transient variation detection according to the fourth embodiment, the upper and lower limit voltages±Δ of the transient variation detection width are set based on the new reference voltage depending on the load current. Therefore, the same transition variation detection level as that of the circuit configuration shown in FIG. 8 can be achieved, and high detection sensitivity to and high stability against the transient variation and optimal fast transient response can be achieved as in the embodiments described earlier.

In the fourth embodiment described above, the two comparators CP1 and CP2 of the transient variation detection means operate as a window comparator. However, the same level of fast transient response can be achieved even if the two comparators are incorporated in the digital signal processing section 100 or operate digitally.

Furthermore, the digital reference voltage signal Dref can be supplied according to the voltage identification (VID) code proposed by Intel Corporation.

Furthermore, while the digital reference voltage signal Dref and the digital transient variation detection width signal DΔ are provided as parallel data, the signals can be transferred from the outside in the form of serial data and converted from serial to parallel in the digital signal processing section 100. Furthermore, the power management bus (PMBus) interface specifications may be observed.

Furthermore, in the above description, the A/D converter and the D/A converter are provided for each signal conversion. However, since a low-speed DSP core or a low-speed processor can be used for the digital signal processing, one A/D converter and one D/A converter can be used for plural signal conversions, and a multiplexer newly provided can be used for selection. In this case, a latch register is needed on the digital side. However, since the signal is processed digitally, any additional hardware is not needed.

Furthermore, the device used for the digital signal processing is not limited to the DSP core or the processor, and special purpose hardware can be used.

Now, a specific example of the functional blocks in the digital signal processing section 100 used in the first to fourth embodiments described above will be described.

Figure 11:
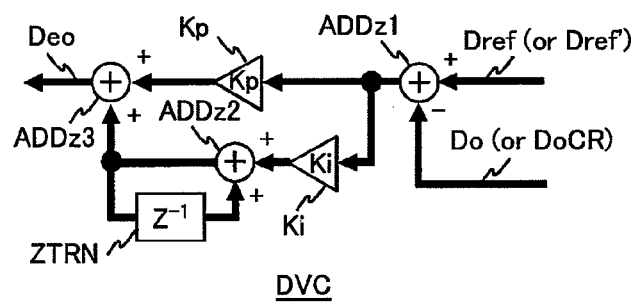
FIG. 11 is a circuit block diagram showing a specific circuit configuration of digital voltage control means according to the fourth embodiment.

FIG. 11 is a diagram showing a specific example of the digital voltage control means DVC. In FIG. 11, the feature corresponding to the error amplifier in the analog control is implemented by the PI control using the z conversion, reference characters ADDz1 to ADDz3 denote adders, reference character ZTRN denotes a z-conversion operator, reference character Kp denote a constant of proportionality, and reference character Ki denotes an integration constant. The digital voltage control means DVC calculates the digital voltage control output signal Deo in such a manner that the actuating error between the digital output voltage signal Do (or the digital voltage signal DoCR) and the digital reference voltage signal Dref (or the new digital reference voltage signal Dref').

Figure 12:
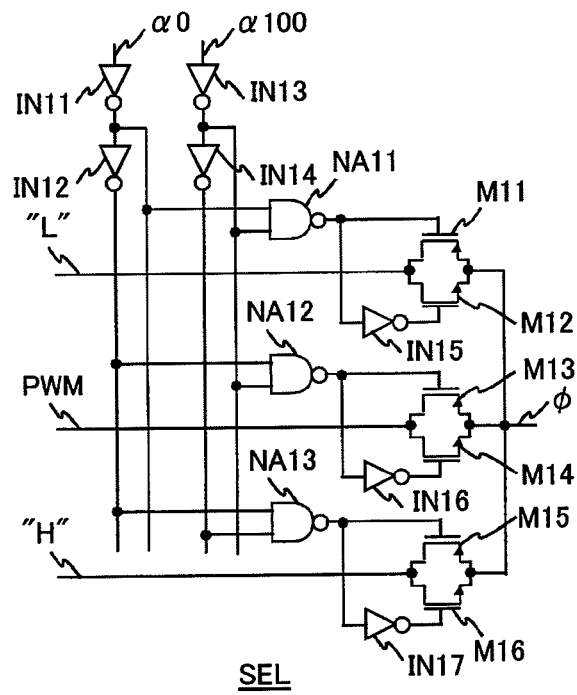
FIG. 12 is a circuit block diagram showing a specific configuration of a selector according to the fourth embodiment.

FIG. 12 shows a specific example of the configuration of the selector SEL. The selector SEL shown in FIG. 12 receives signals "H (corresponding to a PWM pulse signal having a duty of 100% in case of sudden load increase)", PWM (a PWM pulse signal having a desired duty in the steady state) and "L (corresponding to a PWM pulse signal having a duty of 0% in case of sudden load decrease)" and selects one of the three kinds of signals as the output signal φ based on the state of the selection signals α0 and α100. For example, if a sudden load increase is detected, the selection signals α0 and α100 are both set at "H" state. Thus, of NAND gates NA11 to NA13, only the output of the NAND gate NA13 is set at "L", so that MOS transistors M15 and M16 are turned on, and the input signal "H" is selected as the output signal φ.

Figure 13:
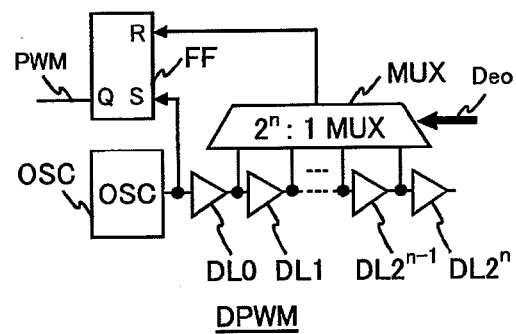
FIG. 13 is a circuit block diagram showing a specific configuration of a digital PWM generator according to the fourth embodiment.

FIGS. 13 to 16 show specific configurations of the digital PWM generator DPWM. The specific example shown in FIG. 13 is composed of delay elements DL0 to DLn, a multiplexer MUX, an R-S flip flop FF, and an oscillator OSC. Supposing that the minimum delay time of the delay elements DL0 to DLn is tdly, a PWM pulse having an on width of Dn*tdly is output as the PWM pulse signal PWM, since a Dn value represented by the digital voltage control output signal Deo output from the digital voltage control means DVC is input to the multiplexer MUX.

Figure 14:
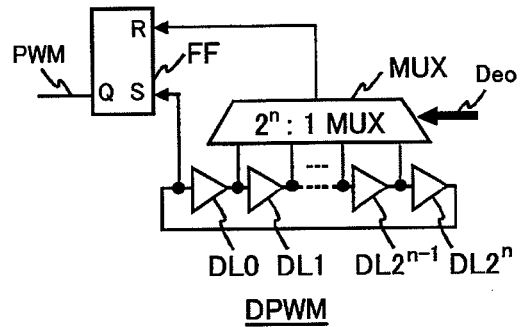
FIG. 14 is a circuit block diagram showing a modification of the digital PWM generator shown in FIG. 13.

FIG. 14 shows a second specific example of the digital PWM generator DPWM and differs from FIG. 13 in that the delay elements DL0 to DLn are arranged in a ring oscillator configuration, and the oscillator OSC is omitted. This allows the same PWM pulse as in FIG. 13 to be output. In this case, since the delay elements are used as an oscillator, the number n of stages thereof has to be set at an odd number.

Figure 15:
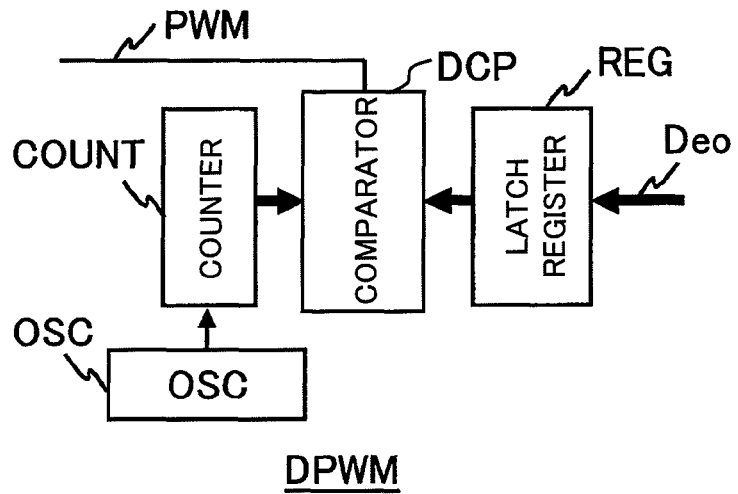
FIG. 15 is a circuit block diagram showing another specific configuration of the digital PWM generator according to the fourth embodiment.

FIG. 15 shows another example of the digital PWM generator DPWM, and the digital PWM generator DPWM shown in FIG. 15 is composed of a digital comparator DCP, a counter COUNT, a latch register REG and an oscillator OSC. In this example, the digital comparator DCP compares the count value of clocks generated by the oscillator OSC and counted by the counter COUNT and Dn value represented by the digital voltage control output signal Deo and set in the latch register REG, and the time required until the count value of the counter COUNT is equal to the Dn value is designated as the on width (on time) of the PWM pulse. In this case, the oscillation frequency of the oscillator OSC is set at an inverse of a half of the minimum delay time tdly required by the delay elements D10 to DLn in FIGS. 13 and 14.

Figure 16:
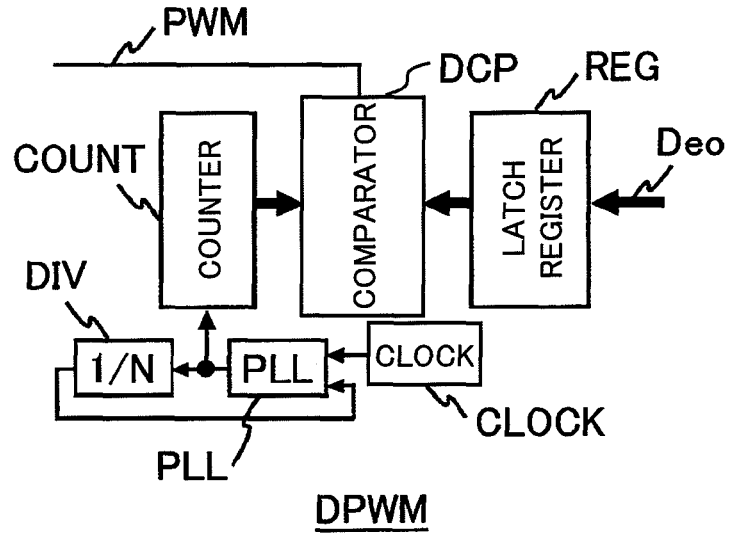
FIG. 16 is a circuit block diagram showing an example in which a phase-locked loop circuit is used as an oscillator of the digital PWM generator according to the fourth embodiment.

FIG. 16 shows a specific example in which a phase-locked loop circuit PLL is used as the oscillator OSC in FIG. 15. The oscillation frequency of the phase-locked loop circuit PLL is the output frequency of a clock generating circuit CLOCK multiplied by N by a divider circuit DIV that divides the frequency by N, and the frequency is input to the counter COUNT. The clock generating circuit CLOCK can be omitted if a clock used for the DSP core, the processor or the like is available. The PLL allows the processing speed to be increased.

Figure 17:
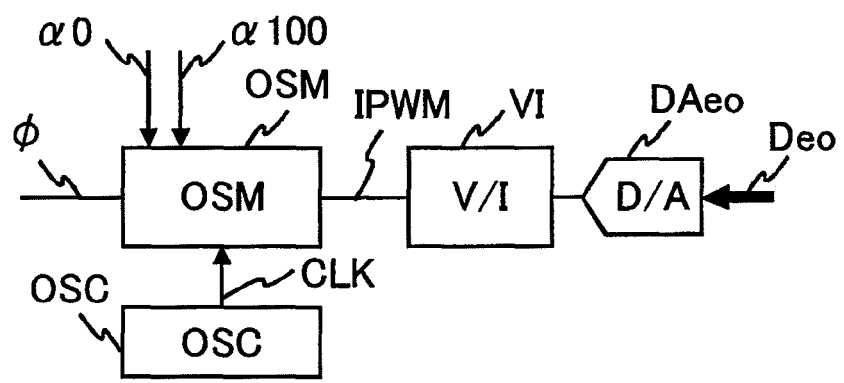
FIG. 17 is a circuit block diagram showing an example in which the digital PWM generator and the selector according to the fourth embodiment is implemented by one circuit (a one-shot multivibrator)

FIG. 17 shows a circuit configuration example in which the two functions of the digital PWM generator DPWM and the selector SEL are integrated. The circuit shown in FIG. 17 is composed of a one-shot multivibrator OSM, a voltage-current conversion circuit VI, a D/A converter DAeo, and an oscillator OSC. The digital voltage control output signal Deo of the digital voltage control means DVC is converted into a current IPWM by the D/A converter DAeo and the voltage-current conversion circuit VI, and the one-shot multivibrator OSM outputs a PWM pulse having a desired duty as the PWM pulse signal φ based on the current IPWM. The one-shot multivibrator OSM can set and change the width of the on time ton based on the value of the current IPWM if the value of a timing capacitor CT is set. The voltage-current conversion circuit VI can be omitted if the D/A converter DAeo is of current output type.

Figure 18:
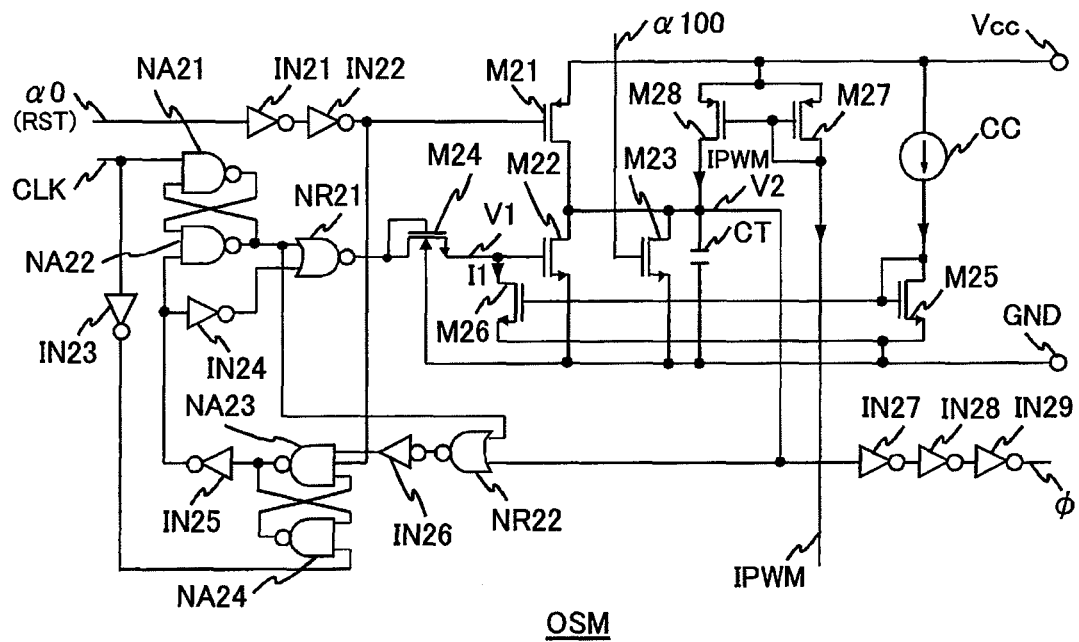
FIG. 18 is a circuit diagram showing details of the one-shot multivibrator used in the example shown in FIG. 17.
Figure 19:
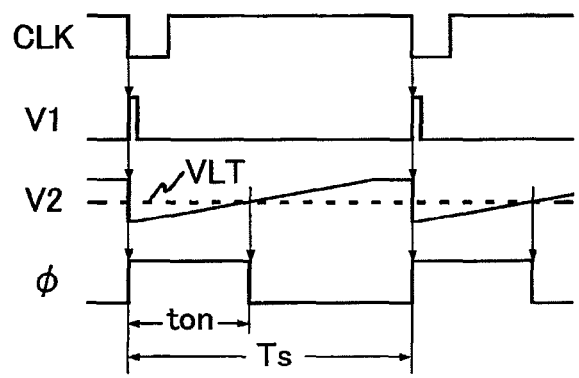
FIG. 19 is a time chart for illustrating an operation of the one-shot multivibrator shown in FIG. 18.

Now, two functions of the one-shot multivibrator OSM shown in FIG. 17, or specifically, PWM pulse generation and the operation of the selector, will be described with reference to the specific OSM circuit configuration diagram of FIG. 18 and the time chart of FIG. 19.

First, PWM pulse generation will be described. When a clock pulse signal CLK shown in FIG. 19 is input, a small pulse occurs at a node V1 at the fall of the clock pulse signal CLK, a MOS transistor M22 is turned and kept on for the duration of the pulse to cause discharge of the timing capacitor CT, thereby making the potential at the node V2 equal to the ground level and setting the output signal φ of the one-shot multivibrator OSM (referred to also as PWM pulse signal) at "High". Then, when the small pulse at the node V1 disappears, the timing capacitor CT starts to be charged with the current IPWM flowing through a MOS transistor M28, and the voltage at the node V2 increases from 0 V with a gradient of CT/IPWM. When the increasing voltage at the node V2 reached a logic threshold voltage VLT of an inverter IN27, the output of the inverter IN27 is inverted, and thus, the PWM pulse signal φ is set back to "Low". The duration of the PWM pulse signal φ from when the PWM pulse signal φ is set at "High" to when the PWM pulse signal φ is set back to "Low", that is, the on time of the PWM pulse signal φ, is denoted by "ton", and the PWM pulse signal φ is generated at the period Ts of the clock pulse signal CLK. The width of the on time ton can be changed based on the value of the current IPWM. Therefore, the PWM pulse signal φ described above is repeatedly generated at the period of the clock pulse signal CLK. In this way, since the one-shot multivibrator OSM outputs the PWM pulse signal, high-speed processing can be achieved.

Now, the operation of the selector will be described. The operation of the selector is implemented by the on/off operation of MOS transistors M21 and M23 of the one-shot multivibrator OSM. Referring to the operating state transition diagram of FIG. 2, in the steady state, the signals α0 and α100 are set at H" and "L", respectively, so that the MOS transistors M21 and M23 are both in the off state, and a PWM pulse having a desired PWM duty is output as the PWM pulse signal φ through the PWM pulse generation operation described above. In case of sudden load change, or specifically, in case of sudden load decrease, referring to FIG. 2, the signal α0 is set at "L", so that the MOS transistor M21 is turned on, and the voltage at the node V2 is forcedly set at the power supply voltage Vcc. As a result, the output signal of the one-shot multivibrator OSM, that is, the PWM pulse signal φ, is set at "L", so that a PWM duty of 0% is achieved. On the other hand, in case of sudden load increase, referring to FIG. 2, the signal α100 is set at "H", so that the MOS transistor M23 is turned on, and the voltage at the node V2 is forcedly set at the ground GND. As a result, the output signal of the one-shot multivibrator OSM, that is, the PWM pulse signal φ, is set at "H", so that a PWM duty of 100% is achieved. That is, a reset signal of the one-shot multivibrator can be used as the selection signal α0, and a signal for turning on the switch M23 newly provided for shorting the timing capacitor CT can be used as the selection signal α100. As described above, if the one-shot multivibrator OSM is used in the digital PWM generator DPWM, the PWM pulse generation and the function of the selector can be implemented by one circuit.

The technique of using the one-shot multivibrator OSM in the digital PWM generator DPWM has an advantage that the footprint of the digital PWM generator DPWM with respect to the chip area can be reduced compared with the cases of the circuits shown in FIGS. 13 to 16 in which the PWM pulse is generated with high resolution.

Fifth Embodiment

Now, there will be described a multi-phase embodiment in which a plurality of power supplies operate in parallel. A multi-phase circuit configuration can be implemented by providing each circuit configuration described above with a plurality of power supply units of the same type (each power supply unit is composed of a gate driver, MOSFETs Q1 and Q2, an LC smoothing filter circuit, a CR filter circuit, comparators CP1 and CP2 and a digital signal processing section. However, the PID of the digital signal processing section can be shared by the plurality of power supply units). In the following, as a representative example, a two-phase configuration will be described.

Figure 20:
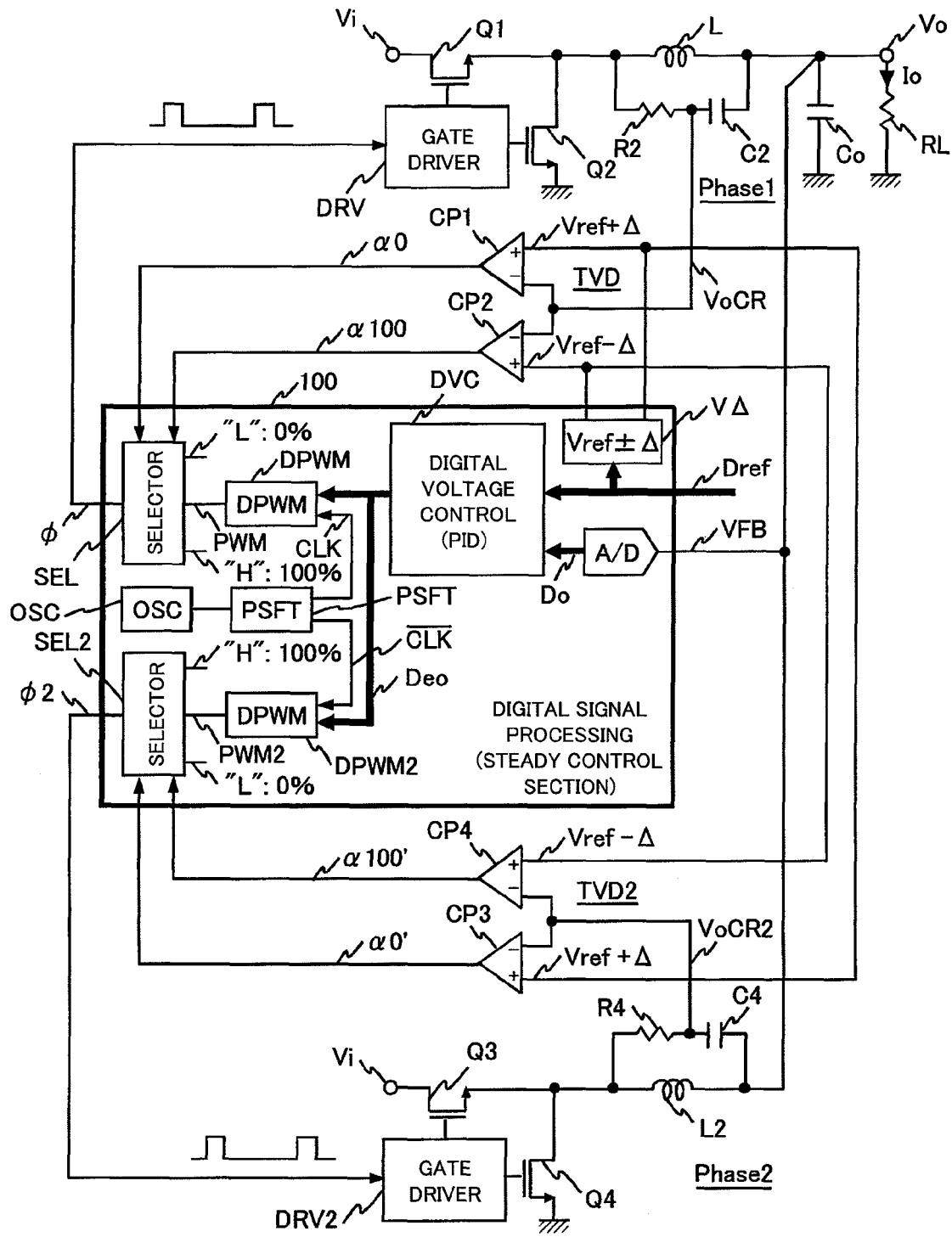
FIG. 20 is a circuit block diagram showing a configuration of a digital control switching power-supply device designed for a multi-phase operation according to a fifth embodiment of the present invention.

FIG. 20 shows an example of a multi-phase circuit configuration based on the circuit shown in FIG. 1 (shown in detail in FIG. 4). In FIG. 20, in order to implement the multi-phase circuit, two digital PWM generators DPWM are provided, the oscillator OSC of the digital PWM generators DPWM is disposed in the digital signal processing section 100, a phase-shift circuit PSFT is connected to the oscillator OSC, and the phase-shift circuit PSFT outputs two-phase pulses CLK and CLKB, which are shifted in phase by 180 degrees. The two-phase clock pulses CLK and CLKB are input to the two digital PWM pulse generators DPWM and DPWM2, respectively. In this way, a multi-phase operation that involves 180-degree shift phase is achieved.

In the case of the two-phase circuit configuration, the tolerance of the load can be doubled, and the variation (ripple) of the output can be reduced (see FIG. 3).

Sixth Embodiment

Figure 21:
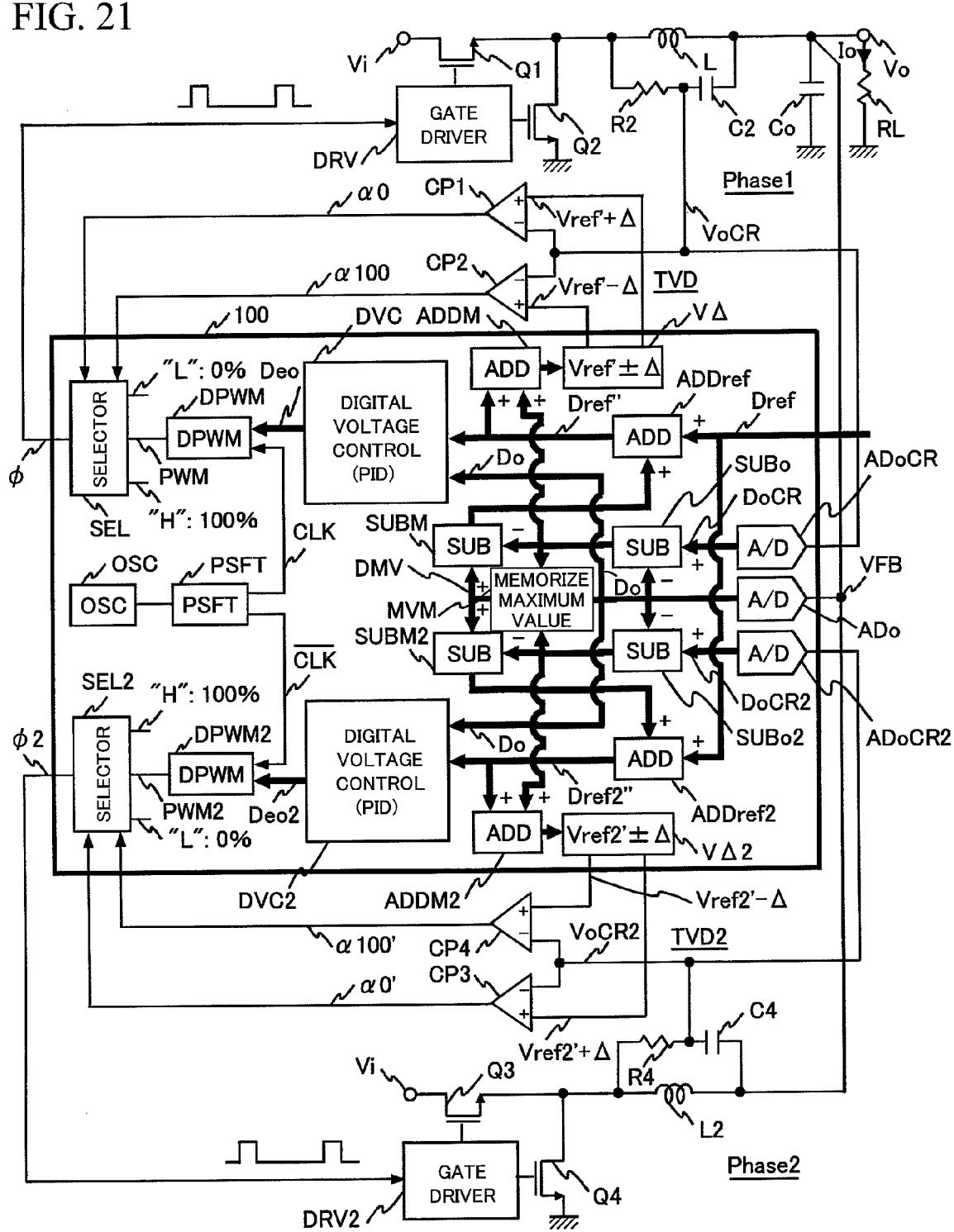
FIG. 21 is a circuit block diagram showing a configuration of a digital control switching power-supply device designed for a multi-phase operation according to a sixth embodiment of the present invention.

FIG. 21 shows an example of a two-phase circuit configuration based on the circuit shown in FIG. 7. The circuit configuration differs from that shown in FIG. 20 in that digital voltage control means DVC and DVC2 are provided for the respective phases in the digital signal processing section 100, and a current share function is incorporated to eliminate the unbalance of the supplied currents in the respective phases due to the difference between the ESR (not shown) of the inductors L and L2 of the digital voltage control means DVC and DVC2.

In the current unbalance compensation by the current share function, the largest one of the currents in the phases is calculated as a maximum value, and the maximum value is memorized. In each phase, a value obtained by adding the difference between the memorized maximum value and the value of the currently flowing current to the digital reference voltage signal is used as a new digital reference voltage signal. Thus, in the phase in which the memorized maximum value is not reached, a PWM pulse signal having an on width increased according to the difference is generated, so that the output voltage Vout is increased, and the current unbalance between the phases is eliminated. Specifically, voltages (VOCR−VFB) and (VoCR2−VFB) for the two phases are digitally calculated, and a maximum value DMV is selected from among the two and memorized in a maximum value memorizing circuit MVM. Here, since the current value of the ESR of the inductor L cannot be calculated, the values of the voltages across the CR filter C2, R2 and the CR filter C4, R4 are used as the equivalent of the current values of the ESR. Then, in each phase, the difference between the memorized maximum value DMV and the voltage (VOCR−VFB) and the difference between the memorized maximum value DMV and the voltage (VoCR2−VFB) are determined by subtracters SUBM and SUBM2, respectively. Then, these values are added to the digital reference voltage signal Dref in adders ADDref and ADDref2, respectively, to generate new digital reference voltage signals Dref" and Dref2". In the case where the new digital reference voltage signals Dref" and Dref2" are used instead of the original digital reference voltage signal Dref, for example, when the current in Phase 1 is greater than the current in Phase 2, the memorized maximum value DMV equals to (DoCR−Do), and thus, the new digital reference voltage signal Dref" for Phase 1 is Dref (=Dref+DMV−(DoCR−Do)), and the new digital reference voltage signal Dref2" is Dref+DMV−(DoCR2−Do). Thus, the multi-phase circuit configuration with the current share function is implemented.

Figure 22:
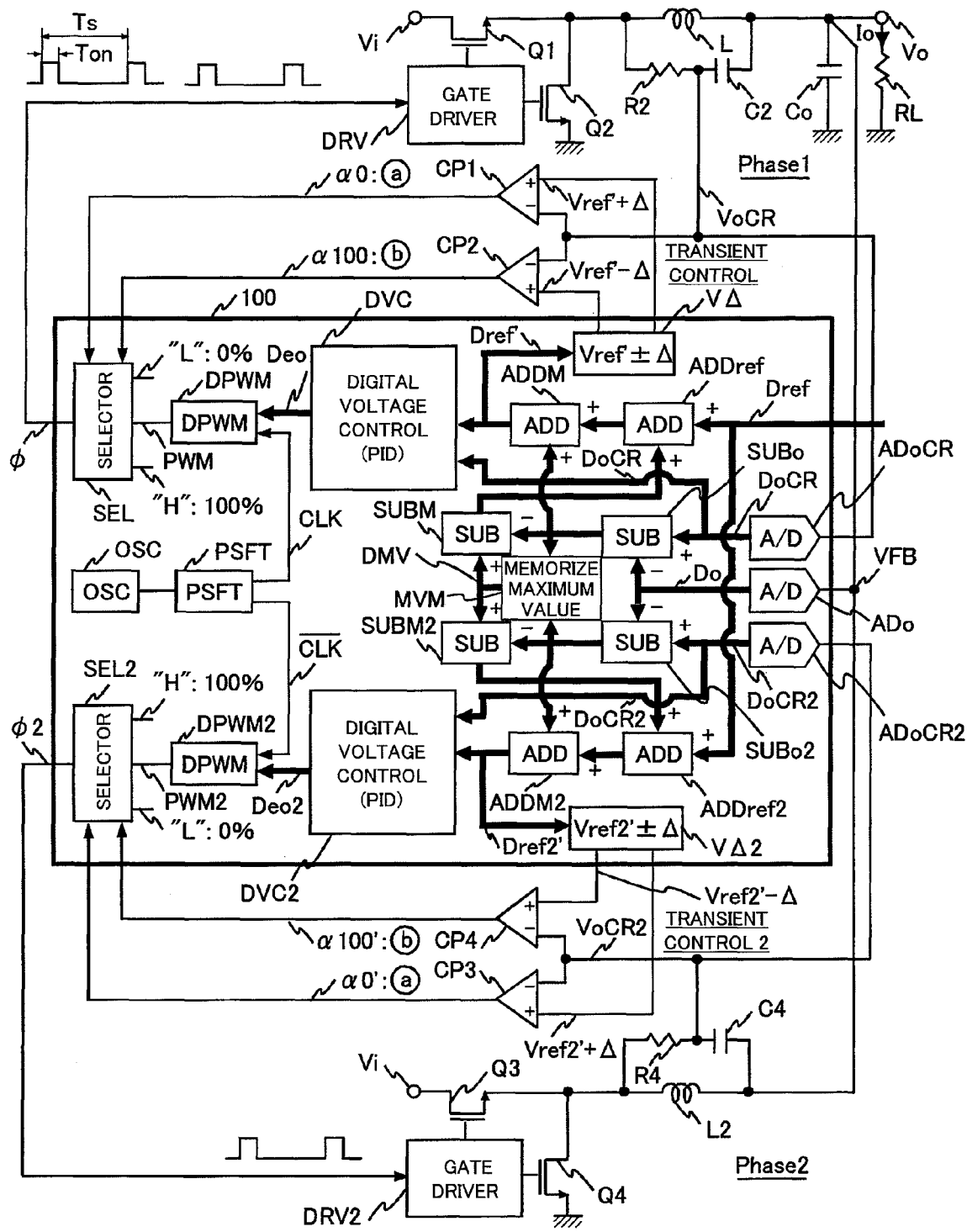
FIG. 22 is a circuit block diagram showing another configuration of a digital control switching power-supply device designed for a multi-phase operation according to the sixth embodiment of the present invention.

In the cases where the output voltage VoCR of the CR filter for transient variation detection is converted into a digital signal, and the digital signal is compared with the digital reference voltage signal Dref to generate a PWM pulse as shown in FIGS. 8 and 10, the circuit configuration can be easily modified into a multi-phase configuration shown in FIG. 22. In this case, new digital reference voltage signals Dref and Dref2' are supplied to digital voltage control means DVC and DVC2.

In the operation described above, the inductor currents from the two power supplies are shifted in phase by 180 degrees, or in other words, in opposite phase in the steady state, and the inductor currents from the two power supplies are in phase in case of transient load change. Thus, it is confirmed that a sudden load change can be addressed. The multi-phase configuration has an advantage that the output current is increased because a plurality of power supplies are used, and the ripple in the output voltage is reduced.

Furthermore, this embodiment can be applied not only to the multi-phase operation of power supplies described above but also to the parallel operation of a plurality of power supplies.

Seventh Embodiment

Figure 23:
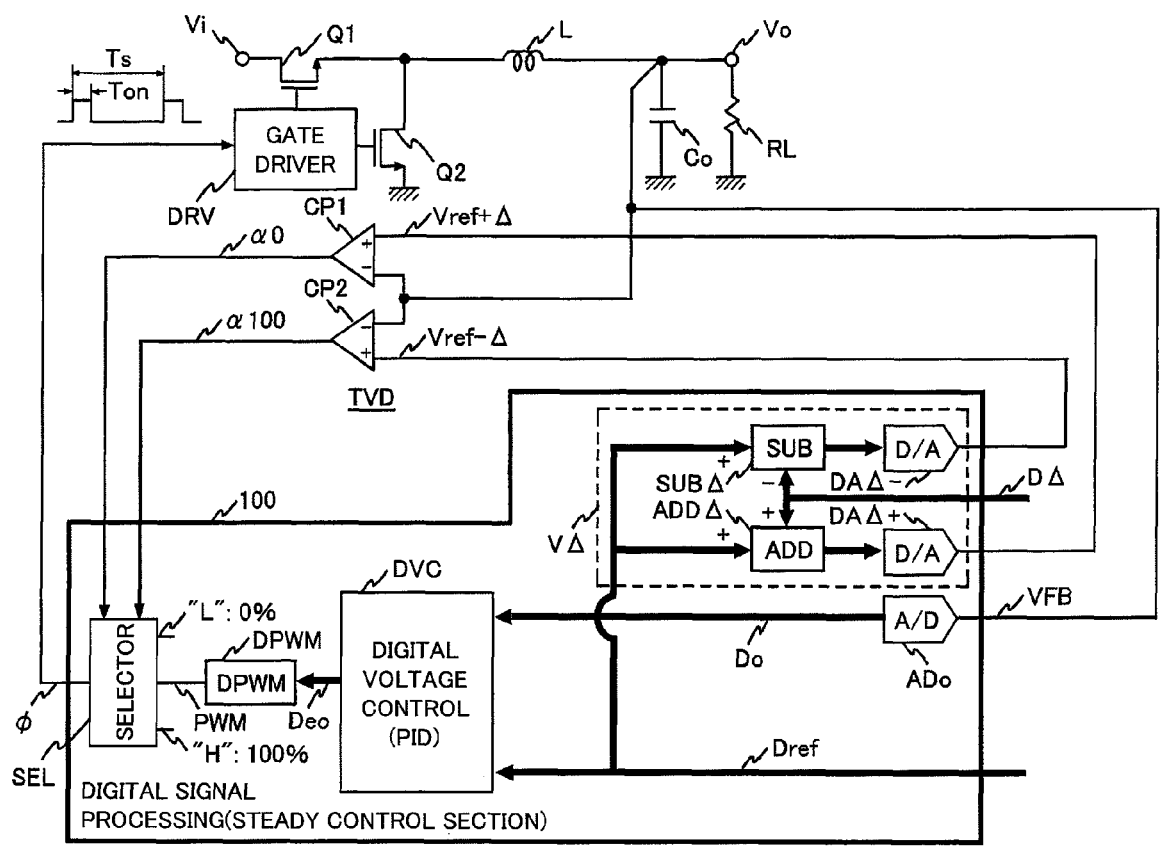
FIG. 23 is a circuit block diagram showing a configuration of a digital control switching power-supply device according to a seventh embodiment of the present invention.

In the embodiments described above, the CR filter composed of the resistor R2 and the capacitor C2 or of the resistor R4 and the capacitor C4 contributes not only to the transient variation detection but also to the current share in the multi-phase operation and the parallel operation. However, if the function of the CR filter is limited only to the current share function, the system for transient variation detection in a single phase operation is as shown in FIG. 23. The circuit configuration shown in FIG. 23 differs from that shown in FIG. 4 in that the CR filter composed of the resistor R2 and the capacitor C2 is omitted, and the voltage at the output terminal Vo is applied to the input terminals (−) of the comparators CP1 and CP2. With such a circuit configuration, the same advantage as that of the circuit configuration shown in FIG. 4 can be achieved.

Figure 24:
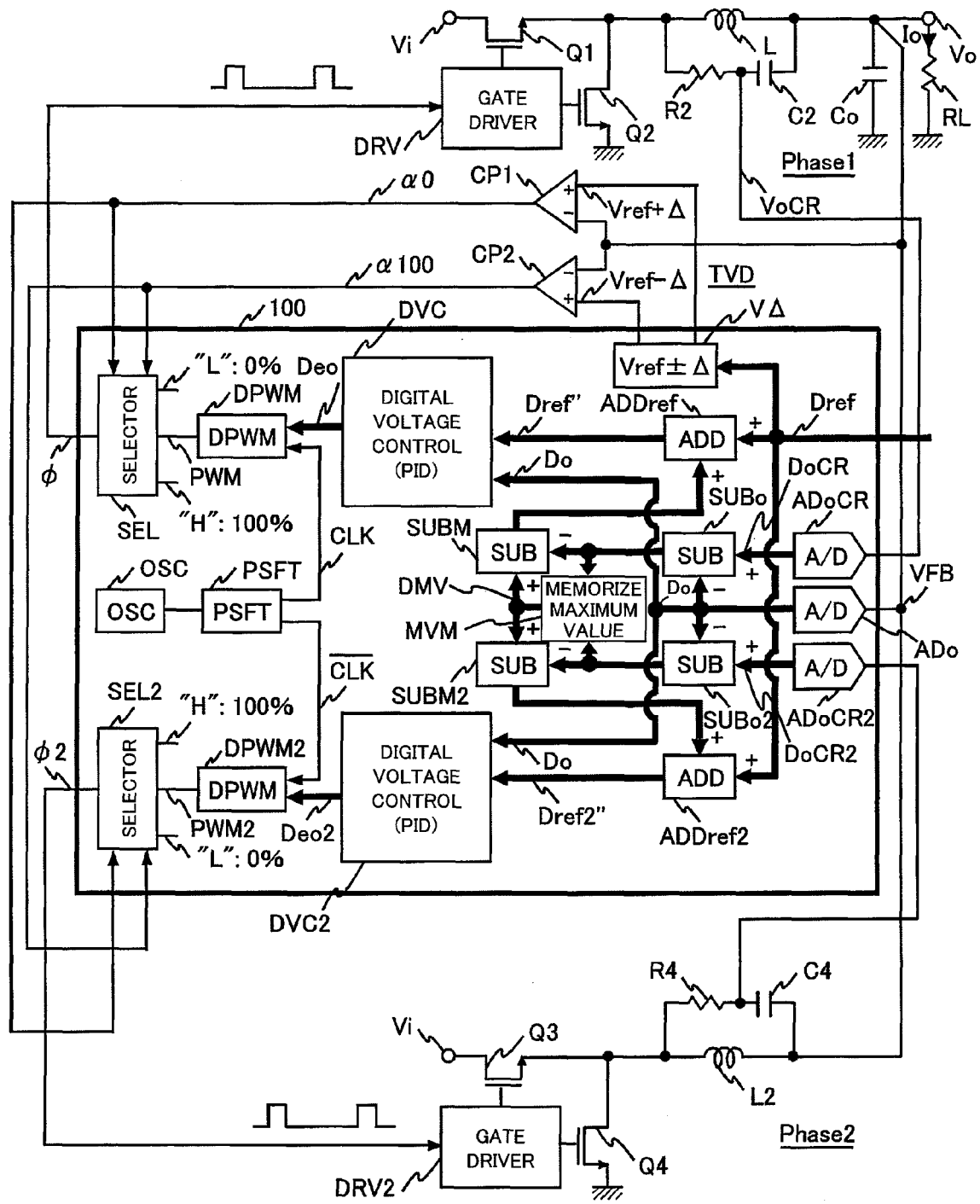
FIG. 24 is a circuit block diagram showing a configuration of a digital control switching power-supply device designed for a multi-phase operation according to the seventh embodiment of the present invention.

FIG. 24 shows an embodiment in which a current share function for the multi-phase operation or parallel operation is implemented based on the circuit configuration shown in FIG. 23. The circuit configuration shown in FIG. 24 differs from that shown in FIG. 21 in that the outputs of the CR filter composed of the resistor R2 and the capacitor C2 and the CR filter composed of the resistor R4 and the capacitor C4 are used only for current share. As for the transient variation detection, the voltage at the output terminal Vo is applied to the input terminals (−) of the comparators CP1 and CP2, so that the transient variation detection signals to be provided to all the power supply units are collectively obtained. Thus, the circuit configuration shown in FIG. 24 differs from that shown in FIG. 21 in that the comparators CP3 and CP4 can be omitted. With the configuration shown in FIG. 24, the circuit can be simplified, and the same advantage as that of the circuit configuration shown in FIG. 21 can be achieved.

Eighth Embodiment

Figure 25:
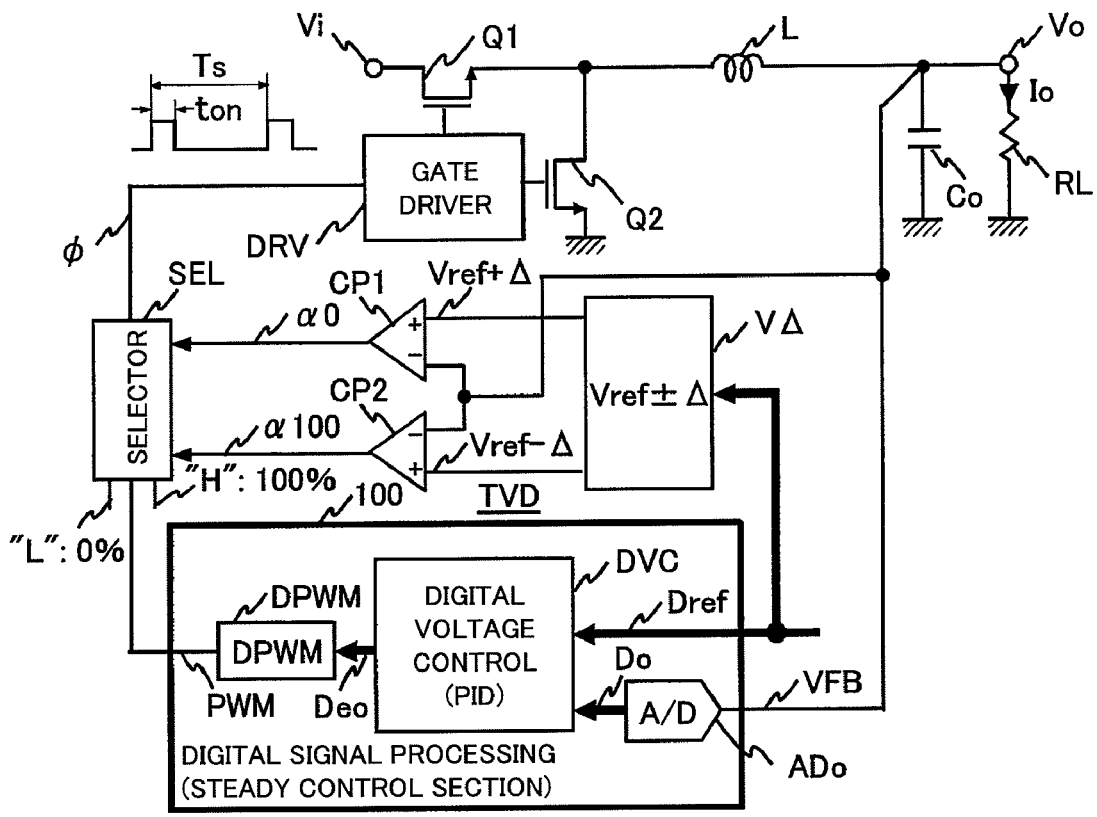
FIG. 25 is a circuit block diagram showing a configuration of a digital control switching power-supply device according to an eighth embodiment of the present invention.

If a commercially available DSP core, processor, special-purpose hardware or the like is used for the digital signal processing section shown in FIG. 23, a configuration equivalent to the configuration shown in FIG. 23 can be realized by additionally providing a (Vref±Δ) generating circuit VΔ, comparators CP1 and CP2 and a selector SEL as shown in FIG. 25. In this case, the (Vref±Δ) generating circuit VΔ is externally provided on the assumption that the (Vref±Δ) generating circuit VΔ cannot be implemented in the digital signal processing section. In this way, a desired circuit can be provided by adding a small number of circuits, and therefore, the existing components can be used without change.

Figure 26:
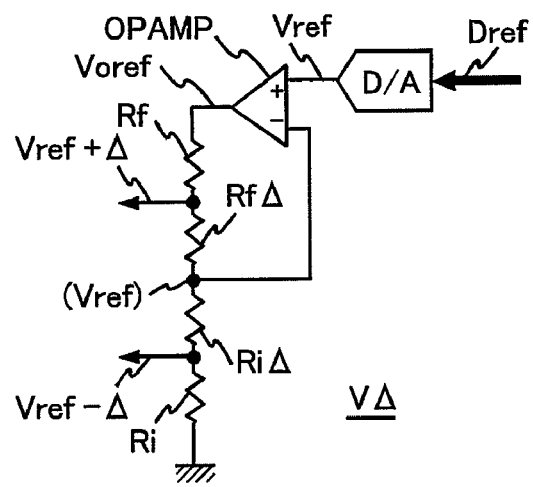
FIG. 26 is a circuit block diagram showing a specific configuration of a (Vref±Δ) generating circuit according to the eighth embodiment.

FIG. 26 shows a specific example of the configuration of the (Vref±Δ) generating circuit VΔ. In FIG. 26, the digital reference voltage signal Dref is converted into the reference voltage signal Vref by the D/A converter DAref, and voltages Vref+Δ and Vref−Δ are generated based on the reference voltage Vref using an operational amplifier OPAMP and our resistors Ri, RiΔ, Rf and RfΔ. Of course, if the (Vref±Δ) generating circuit VΔ can be implemented in the digital signal processing section, this circuit can be omitted.

Figure 27:
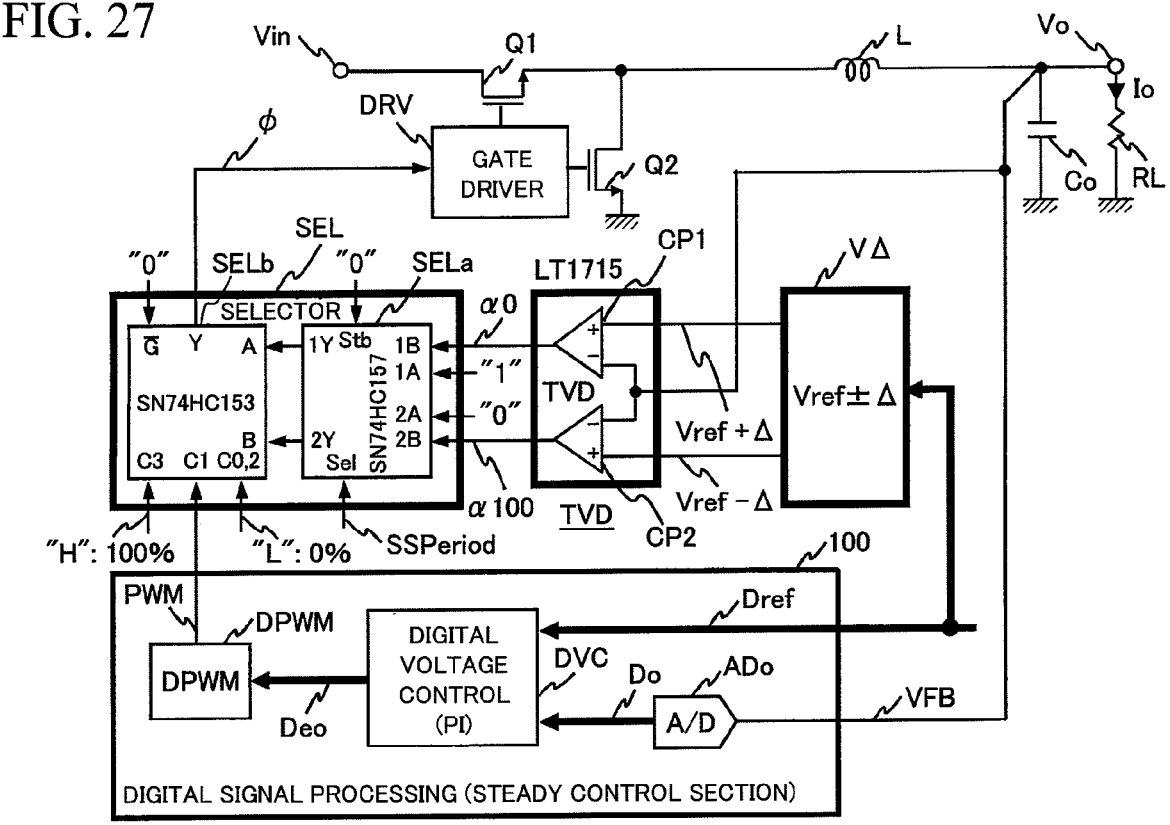
FIG. 27 is a circuit block diagram showing a configuration in which commercially available ICs are used as transient variation detection means and a selector according to the eighth embodiment.

FIG. 27 shows an example of a circuit configuration in which the comparators CP1 and CP2 and the selector SEL shown in FIG. 25 are constituted by commercially available discrete components. In FIG. 27, LT1715 manufactured by Linear Technology Corporation is used for the comparators CP1 and CP2, and a combination of SN74HC157 and SN74HC153, which are general purpose logic ICs, is used for the selector SEL. The SN74HC157 is used because, at start-up of the power supply, the transient variation detection has to be inhibited to smoothly raise the output voltage at the output terminal Vo only by the digital signal processing.

Figure 28:
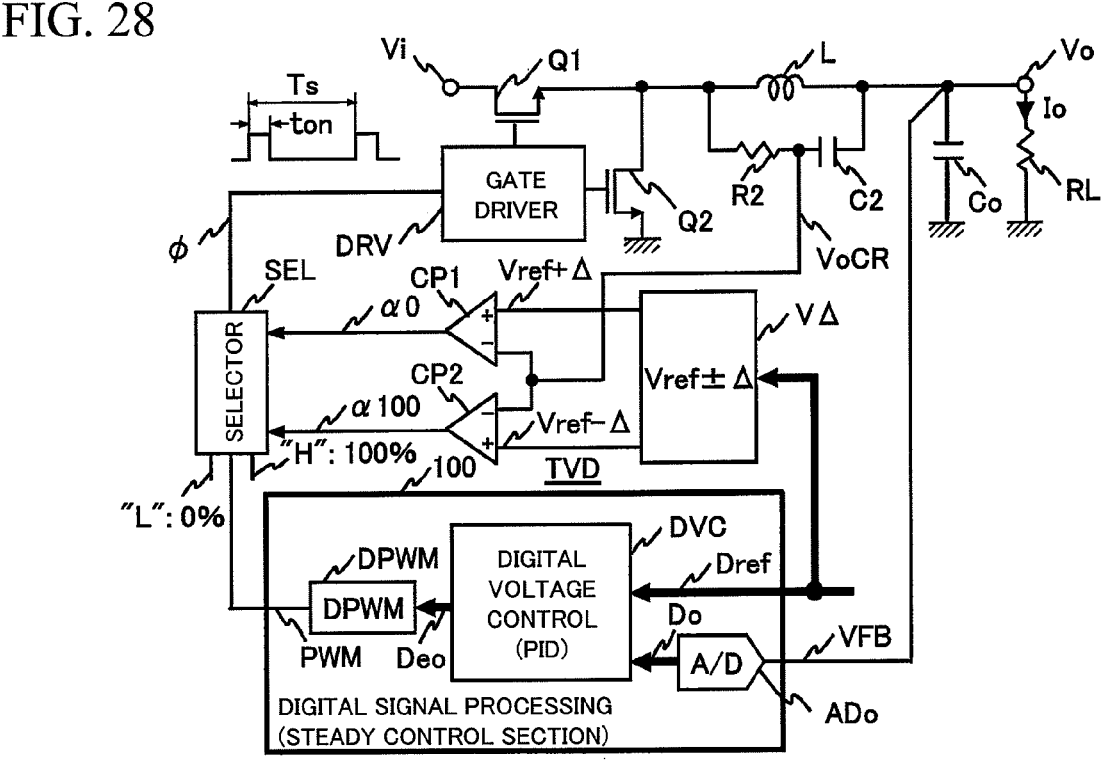
FIG. 28 is a circuit block diagram showing a configuration of the digital control switching power-supply device according to the first embodiment of the present invention that is composed of a commercially available digital signal processing section and a selector and a (Vref±Δ) generating circuit externally added thereto.

Furthermore, FIG. 28 shows a circuit configuration of FIG. 1 expressed in the same manner as in FIG. 25. Specifically, a commercially available DSP core, processor, special-purpose hardware or the like is used for the digital signal processing section, and only a (Vref±Δ) generating circuit VΔ, comparators CP1 and CP2 and a selector SEL are additionally provided. In this way, the circuit configuration shown in FIG. 1 can be implemented using a commercially available processor or the like. Furthermore, a multi-phase circuit configuration can also be provided based on the circuit configuration shown in FIG. 28 as described above.

Figure 29:
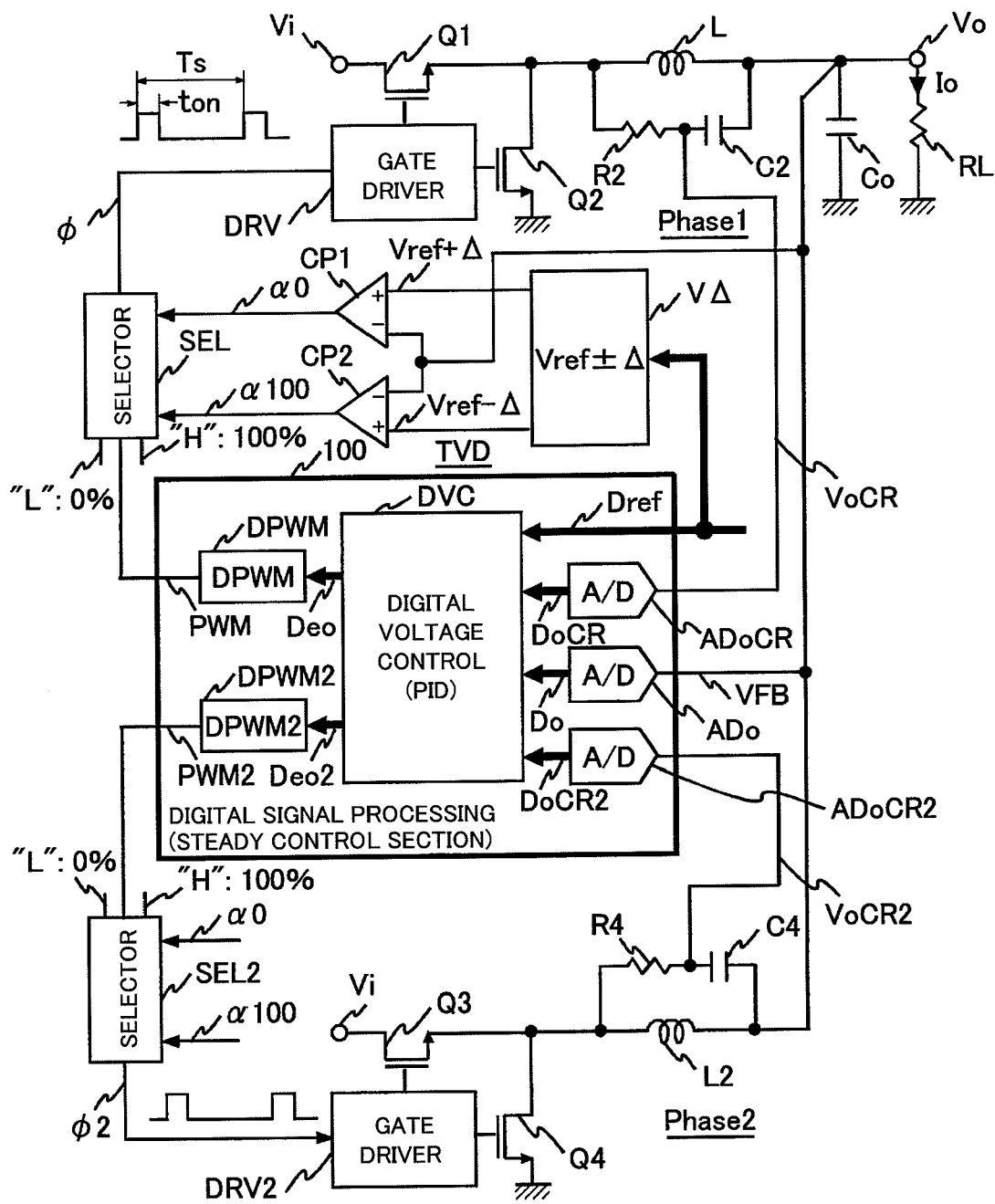
FIG. 29 is a circuit block diagram showing a configuration of a multi-phase digital control switching power-supply device formed based on the configuration according to the eighth embodiment of the present invention.

FIG. 29 shows an example of a circuit configuration for achieving current share in the multi-phase operation or parallel operation based on the circuit configuration shown in FIG. 25. The circuit configuration can be easily implemented if the commercially available DSP core, processor, special purpose hardware or the like used for the digital signal processing section is available for the multi-phase operation or the like, and the same advantage as that of the embodiments described above can be achieved.

In the embodiment described above, the digital reference voltage signal Dref is supplied as the reference signal. However, if the reference voltage Vref is supplied as the reference signal, the digital signal processing section has to convert the reference voltage Vref into the digital reference voltage signal Dref with the A/D converter. In this case, the D/A converter DAref shown in FIG. 26 can be omitted.

In addition, in the embodiment described above, the digital voltage control means DVC, the digital PWM generator DPWM and the like are used in the digital signal processing section to perform digital control. However, the present invention is not limited thereto, and analog control can also be performed.

Figure 30:
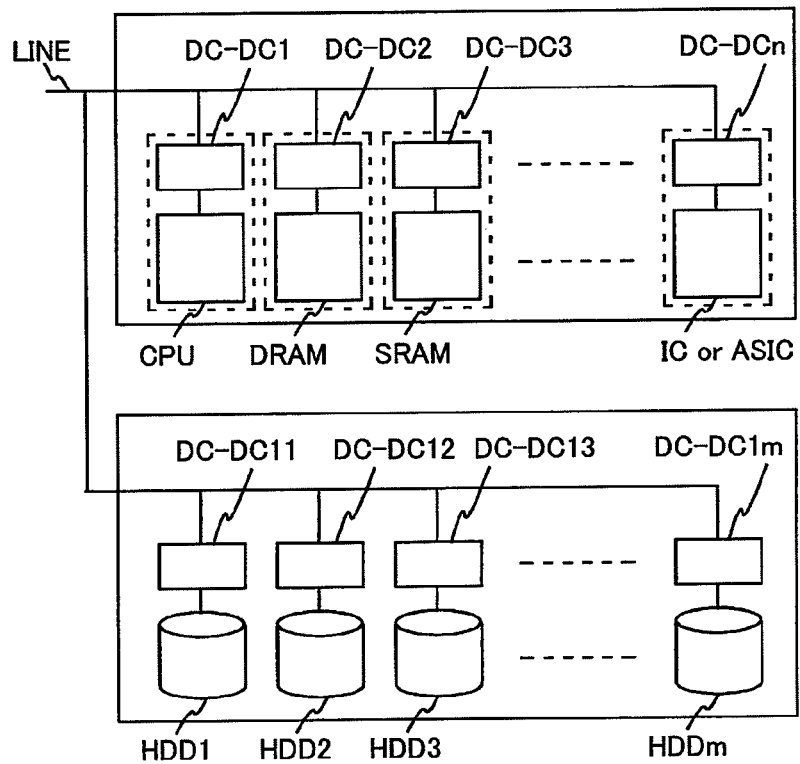
FIG. 30 is a diagram showing a configuration of a power supply for information processing of a HDD on which the digital control switching power-supply device according to any of the embodiments of the present invention is mounted.

APPLICATIONS OF THE INVENTION (1) FIG. 30 shows an example in which the power-supply device according to the present invention is applied to a hard disk drive (HDD). In this example, DC-DC converters DC-DC1 to DC-DCn, which are power-supply devices according to any of the first to eighth embodiments, supply various amounts of power at appropriate voltages to boards constituted by a processor CPU for controlling storage of data in HDDs, high-speed large-capacity memories including DRAM and SRAM and the like. As the DC-DC converters DC-DC1 to DC-DCn serving as power-supply devices shown in FIG. 30, a single-phase power-supply device or a multi-phase power-supply device is used depending on the current capacity of the processor CPU, the high-speed large-capacity memories including DRAM and SRAM and the like, to which the DC-DC converter is to supply power.

As HDDs HDD1 to HDDm, power-supply devices DC-DC11 to DC-DC1m which are different from those according to the present invention, are used.

Figure 31:
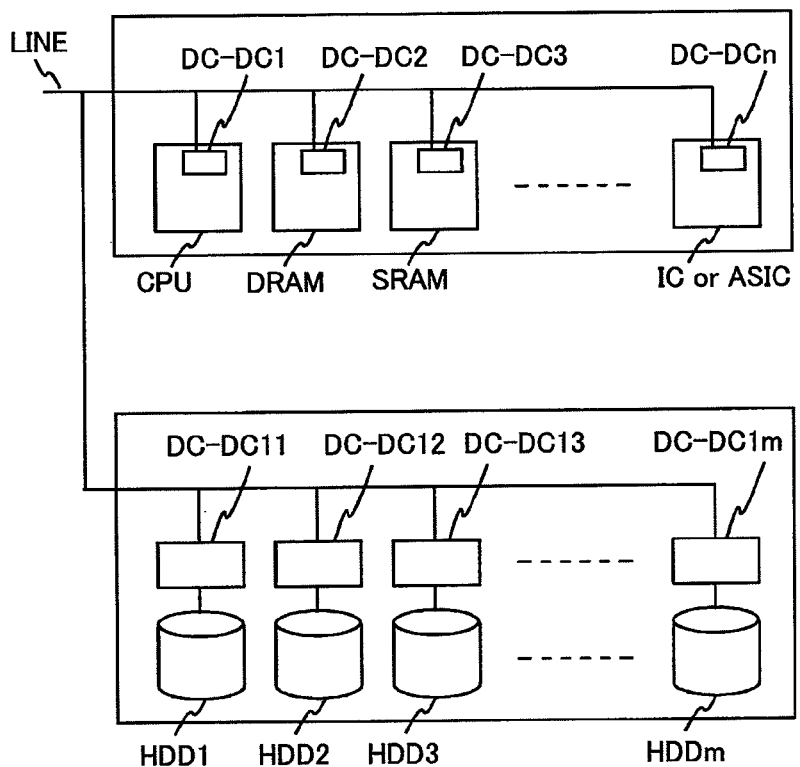
FIG. 31 is a diagram showing another configuration of a power supply for information processing of a HDD on which the digital control switching power-supply device according to any of the embodiments of the present invention is mounted.

(2) FIG. 31 shows a configuration in which DC-DC converters DC-DC1 to DC-DCn, which are power-supply devices according to any of the first to eighth embodiments, are mounted on chips or packages on which a processor CPU for controlling storage of data in HDDs, high-speed large-capacity memories including DRAM and SRAM and the like are mounted and supply various amounts of power at appropriate voltages to the components. If the DC-DC converters DC-DC1 to DC-DCn are mounted on the same chips or packages as the processor CPU, the high-speed large-capacity memories DRAM, SRAM and the like in this way, the length of power-supply wires interconnecting the DC-DC converters and the loads such as the processor CPU and the high-speed large-capacity memories DRAM and SRAM can be minimized, so that the output voltage variation in response to a sudden load change can be substantially reduced, and fast transient response can be advantageously achieved.

Furthermore, although not shown, according to another possible embodiment, DC-DC converters DC-DC1 to DC-DCn are implemented as ICs and mounted on the same package as the processor CPU for controlling storage of data in HDDs, the high-speed large-capacity memories including DRAM and SRAM and the like. In this case also, fast transient response at the time of sudden load change can be advantageously achieved.

In the above description, power MOSFETs are used as semiconductor switching components. However, other power switching components, such as an IGBT, a GaN device and a silicon carbide (SiC) device, can be used, as far as the configuration is the on-board configuration.

If the power-supply devices are mounted on (built-in) the same chips or packages as the processor CPU, the high-speed large-capacity memories DRAM and SRAM and the like, switching components that are manufactured by the same process as the chips, such as CMOS devices, can be used as semiconductor switching components.

Furthermore, while the high-side semiconductor switching components are of N type in the above description, the high-side semiconductor switching components can also be of P type.

(3) Although not shown, of course, the digital control switching power-supply devices according to the first to eighth embodiments can be applied to a VRM, a DC-DC converter for portable equipment, a general-purpose DC-DC converter and the like.

SUMMARY

The digital control system according to each embodiment can be applied to an isolated type DC-DC converter, such as a single-transistor forward type converter, a two-transistor forward type converter, a push-pull type converter, a half bridge type converter and a full bridge type converter.

Furthermore, of course, in the digital signal processing using the commercially available DSP core, processor, special-purpose hardware and the like, if the transient variation detection means and the selector are additionally provided, the digital control switching power-supply devices according to the first to seventh embodiments that can achieve fast transient response to a current change of several hundred A/μs or higher can be provided.

The digital control switching power-supply device according to each embodiment detects a sudden load change that involves a current change of several hundred A/μs or higher by means of the transient variation detection means, and the detection action is performed without the fast digital signal processing, so that fast transient response can be achieved. The fast transient response allows suppression of the output voltage variation, and therefore, the capacitance of the output capacitor can be reduced, and the size and cost of the system and the device can be reduced. In addition, a low-speed and inexpensive DSP core, processor (CPU) or the like can be used for the digital signal processing for the reason described above, so that the cost can be further reduced.

Furthermore, since the digital control switching power-supply device according to each embodiment can achieve fast transient response only if the speed of the transient variation detection means is increased. Therefore, even if the speed of the digital signal processing is low, the switching power-supply device can achieve a switching operation not only at a frequency of 1 MHz but also at a high frequency of several hundred MHz.

Furthermore, the digital control switching power-supply device according to each embodiment can be used for a multi-phase operation or parallel operation of plural power supplies, the output current can be increased, and the ripple of the output voltage can be reduced.

What is claimed is:

1. A digital control switching power-supply device having a plural number of power supply units,
   wherein each power supply unit comprises:
   a digital signal processing section having digital voltage control means that performs control so that the difference signal between a digital output voltage signal obtained by digitizing a fed-back output voltage of the switching power-supply device and a digital reference voltage signal obtained by digitizing a reference voltage of a command signal is zero and a digital pulse width modulation (DPWM) generator that generates a pulse width modulation (PWM) pulse signal;
   a pair of power semiconductor switching components driven by the PWM pulse signal;
   an LC smoothing filter that converts a square wave voltage resulting from switching of said pair of power semiconductor switching components into a direct current;
   transient variation detection means that detects a transient variation at the time of a sudden load change; and
   selection means that selects any of a PWM pulse signal having a desired duty generated by said DPWM generator and a PWM pulse signal having a preset fixed duty according to the result of detection by said transient variation detection means,
   said pair of power semiconductor switching components is driven by the PWM pulse signal selected by said selection means, and
   a common output capacitor is shared by said LC smoothing filters of said plural number of power supply units,
   wherein said transient variation detection means has a CR filter for transient variation detection provided across an inductor L of said LC smoothing filter and a transient variation detection circuit composed of a window comparator provided at an output terminal of the CR filter,
   said transient variation detection circuit compares an output voltage of said CR filter with upper and lower limit values preset around a reference voltage set to provide a desired output voltage of the switching power-supply device in order to obtain detection information at the time of a sudden load change and supplies the comparison result to said selection means,
   said selection means receives said comparison result as a selection signal and selects from among said PWM pulse signals based on said comparison result, and
   the digital control switching power-supply device further comprises:
   a maximum value memory circuit that determines the difference signal between a digital signal obtained by A/D-converting the output voltage of said CR filter and a digital output voltage signal obtained by A/D-converting the output voltage of the digital control switching power-supply unit and selects and memorizes the maximum value of plural number of difference signals generated by the power supply units; and
   means for generating a compensation digital reference voltage signal by adding, to said digital reference voltage value, the difference value between the maximum difference signal value memorized in said maximum value memory circuit and the difference signal between the digital signal obtained by A/D-converting the output voltage of said CR filter of each power supply unit and the digital output voltage signal obtained by A/D-converting the output voltage of the digital control switching power-supply device.

2. The digital control switching power-supply device according to claim 1, wherein the upper and lower limit values preset around said reference voltage are generated by carrying out addition and subtraction of said digital reference voltage signal and a digital transient variation detection width signal that defines a transient variation detection range and D/A-converting the values generated by the respective arithmetic operations.

3. The digital control switching power-supply device according to claim 1, wherein said digital voltage control means uses digital PID control or digital PI control.

4. The digital control switching power-supply device according to claim 1, wherein said DPWM generator has $2^n$ stages of delay elements, an oscillator that provides a switching period to the $2^n$ stages of delay elements, a multiplexer that selects and outputs one of the $2^n$ output signals of the delay elements based on the output signal of said digital voltage control means, and an R-S flip flop that generates a desired PWM pulse signal by being set by a clock signal from said oscillator and reset by the output signal from said multiplexer.

5. The digital control switching power-supply device according to claim 1, wherein said DPWM generator comprises $2^n$ stages of delay elements configured as a ring oscillator, a multiplexer that selects and outputs one of the $2^n$ output signals of the delay elements based on the output signal of said digital voltage control means, and an R-S flip flop that generates a desired PWM pulse signal by setting by a signal from said ring oscillator and resetting by the output signal from said multiplexer.

6. The digital control switching power-supply device according to claim 1, wherein said DPWM generator has a latch register that sets the output signal of said digital voltage control means, an oscillator, a counter that counts output clocks from the oscillator, and a digital comparator that compares the value of said latch register with the value of said counter, which is counted from zero, and generates a PWM pulse signal having a desired duty until the two values are equal to each other.

7. The digital control switching power-supply device according to claim 1, wherein said DPWM generator comprises a latch register that sets the output signal of said digital voltage control means, a phase lock loop (PLL), a counter that counts output clocks from said phase lock loop (PLL), and a digital comparator that compares the value of said latch register with the value of said counter, which is counted from zero, and that generates a PWM pulse signal having a desired duty until the two counter values are equal to each other.

8. The digital control switching power-supply device according to claim 1, wherein supposing that the outputs of said transient variation detection means are used as selection signals $\alpha 0$ and $\alpha 100$, said selection means determines that it is in a steady state and selects a PWM pulse signal having a desired duty output from said DPWM generator in a case where the operating states of the selection signals a0 and $\alpha 100$ are "H" and "L", respectively, determines that a sudden decrease in load occurs and selects the PWM pulse signal having a duty of 0% in a case where the operating states of the selection signals $\alpha 0$ and $\alpha 100$ are both "L", and determines that a sudden increase in load occurs and selects the PWM pulse signal having a duty of 100% in a case where the operating states of the selection signals $\alpha 0$ and $\alpha 100$ are both "H".

9. The digital control switching power-supply device according to claim 8, wherein said selection means and said DPWM generator are configured as a unit,
said integrated circuit has a D/A converter that outputs a current according to the output signal of said digital voltage control means, a one-shot multivibrator that generates a PWM pulse signal having a desired duty according to said current, and an oscillator that provides a PWM period to the one-shot multivibrator, and
the outputs of said transient variation detection means are signals corresponding to the selection signals $\alpha 0$ and $\alpha 100$ for said selection means, said selection signal $\alpha 0$ is a reset signal for the one-shot multivibrator, and said selection signal $\alpha 100$ is a signal for turning on a switch provided for shorting a timing capacitor in the one-shot multivibrator.

10. The digital control switching power-supply device according to claim 1, further comprising:
an oscillator that generates a clock signal; and
a phase shift circuit that shifts the phase of the clock signal generated by said oscillator to generate a plural number of phase shift clock signals, and
in order to operate said plural number of power supply units in parallel, said oscillator is shared by said plural number of power supply units, and said generated phase shift clock signals are supplied to the respective DPWM generator in said plural number of power supply units.

11. The digital control switching power-supply device according to claim 1, wherein said transient variation detection means is a window comparator provided at an output end of the digital control switching power-supply device and compares the output voltage of the digital control switching power-supply device with upper and lower limit values preset around a reference voltage set to provide the output voltage and supplies the comparison result to said selection means,
said selection means receives said comparison result as a selection signal and selects from among said PWM pulse signals based on said comparison result, and
the upper and lower limit values preset around said reference voltage are determined externally or internally to said digital signal processing section using said reference voltage and a transient variation detection width that defines a transient variation detection range.

12. A digital control switching power-supply device having a plural number of power supply units,
wherein each power supply unit comprises:
a digital signal processing section having digital voltage control means that performs control so that the difference signal between a digital output voltage signal obtained by digitizing a fed-back output voltage of the switching power-supply device and a digital reference voltage signal obtained by digitizing a reference voltage of a command signal is zero and a digital pulse width modulation (DPWM) generator that generates a pulse width modulation (PWM) pulse signal;
a pair of power semiconductor switching components driven by the PWM pulse signal;
an LC smoothing filter that converts a square wave voltage resulting from switching of said pair of power semiconductor switching components into a direct current;
transient variation detection means that detects a transient variation at the time of a sudden load change, wherein the transient variation detection means includes a CR filter for transient variation detection provided across an inductor L of said LC smoothing filter and a transient variation detection circuit having a window comparator, provided at an output terminal of the CR filter, for comparing an output voltage of said CR filter with upper and lower limit values preset around a reference voltage corresponding to an analog value to which said digital reference voltage signal is converted, to generate a comparison result and wherein said transient variation detection circuit is provided in parallel with said digital signal processing section and outputs the comparison result; and
selection means that selects any of a PWM pulse signal having a desired duty generated by said DPWM generator and a PWM pulse signal having a preset fixed duty according to the result of detection by said transient variation detection means, wherein said selection means selects and outputs a PWM pulse signal having a preset fixed duty of 100% which is preset irrespective of a PWM pulse signal generated by said DPWM generator in said digital signal processing section in case where said transient variation detection means detects that said output voltage becomes lower than said preset lower limit value of said CR filter, wherein said selection means selects and outputs a PWM pulse signal having a fixed duty of 0% which is preset irrespective of the PWM pulse signal generated by said DPWM generator in said digital signal processing section in case where said transient variation detection means detects that said output voltage becomes higher than said preset upper limit value of said CR filter and wherein said selection means selects and outputs said PWM pulse having said desired duty generated by said DPWM generator in said digital signal processing section in other cases,
wherein said pair of power semiconductor switching components is driven by the PWM pulse signal selected and outputted by said selection means,
wherein a common output capacitor is shared by said LC smoothing filters of said plural number of power supply units,
said selection means receives said comparison result as a selection signal and selects from among said PWM pulse signals based on said comparison result, and
the digital control switching power-supply device further comprises:
a maximum value memory circuit that determines the difference signal between a digital signal obtained by A/D- converting the output voltage of said CR filter and a digital output voltage signal obtained by A/D-converting the output voltage of the digital control switching power-supply unit and selects and memorizes the maximum value of plural number of difference signals generated by the power supply units; and means for generating a compensation digital reference voltage signal by adding, to said digital reference voltage value, the difference value between the maximum difference signal value memorized in said maximum value memory circuit and the difference signal between the digital signal obtained by A/D-converting the output voltage of said CR filter of each power supply unit and the digital output voltage signal obtained by A/D-converting the output voltage of the digital control switching power-supply device.

13. A digital control switching power-supply device having a plural number of power supply units, wherein each power supply unit comprises:

a digital signal processing section having digital voltage control means that performs control so that the difference signal between a digital output voltage signal obtained by digitizing a fed-back output voltage of the switching power-supply device and a digital reference voltage signal obtained by digitizing a reference voltage of a command signal is zero and a digital pulse width modulation (DPWM) generator that generates a pulse width modulation (PWM) pulse signal;

a pair of power semiconductor switching components driven by the PWM pulse signal;

an LC smoothing filter that converts a square wave voltage resulting from switching of said pair of power semiconductor switching components into a direct current;

transient variation detection means that detects a transient variation at the time of a sudden load change, wherein the transient variation detection means includes a CR filter for transient variation detection provided across an inductor L of said LC smoothing filter and a transient variation detection circuit having a window comparator, provided at an output terminal of the CR filter, for comparing an output voltage of said CR filter with upper and lower limit values preset around a reference voltage corresponding to an analog value to which said digital reference voltage signal is converted, to generate a comparison result and wherein said transient variation detection circuit is provided in parallel with said digital signal processing section and outputs the comparison result; and selection means that selects any of a PWM pulse signal having a desired duty generated by said DPWM generator and a PWM pulse signal having a preset fixed duty according to the result of detection by said transient variation detection means, wherein said selection means selects and outputs a PWM pulse signal having a preset fixed duty of 100% which is preset irrespective of a PWM pulse signal generated by said DPWM generator in said digital signal processing section in case where said transient variation detection means detects that said output value becomes lower than said preset lower limit value of said CR filter, wherein said selection means selects and outputs a PWM pulse signal having a fixed duty of 0% which is preset irrespective of the PWM pulse signal generated by said DPWM generator in said digital signal processing section in case where said transient variation detection means detects that said output voltage becomes higher than said preset upper limit value of said CR filter and wherein said selection means selects and outputs said PWM pulse having said desired duty generated by said DPWM generator in said digital signal processing section in other cases, wherein said pair of power semiconductor switching components is driven by the PWM pulse signal selected and outputted by said selection means, and wherein a common output capacitor is shared by said LC smoothing filters of said plural number of power supply units.

wherein said transient variation detection means is a window comparator provided at an output end of the digital control switching power-supply device and compares the output voltage of the digital control switching power-supply device with upper and lower limit values preset around a reference voltage set to provide the output voltage and supplies the comparison result to said selection means, said selection means receives said comparison result as a selection signal and selects from among said PWM pulse signals based on said comparison result, and the digital control switching power-supply device further comprises:

a maximum value memory circuit that determines the difference signal between a digital signal obtained by A/D-converting the output voltage of a CR filter provided across an inductor L of said LC smoothing filter and a digital output voltage signal obtained by A/D-converting the output voltage of the digital control switching power-supply unit and selects and memorizes the maximum value of plural number of difference signals generated by the power supply units; and means for generating a compensation digital reference voltage signal by adding, to said digital reference voltage value, the difference value between the maximum difference signal value memorized in said maximum value memory circuit and the difference signal between the digital signal obtained by A/D-converting the output voltage of said CR filter of each power supply unit and the digital output voltage signal obtained by A/D-converting the output voltage of the digital control switching power-supply device.

14. A digital control switching power-supply device having a plural number of power supply units, wherein each power supply unit comprises:

a digital signal processing section having digital voltage control means that performs control so that the difference signal between a digital output voltage signal obtained by digitizing a fed-back output voltage of the switching power-supply device and a digital reference voltage signal obtained by digitizing a reference voltage of a command signal is zero and a digital pulse width modulation (DPWM) generator that generates a pulse width modulation (PWM) pulse signal;

a pair of power semiconductor switching components driven by the PWM pulse signal;

an LC smoothing filter that converts a square wave voltage resulting from switching of said pair of power semiconductor switching components into a direct current;

transient variation detection means that detects a transient variation at the time of a sudden load change; and selection means that selects any of a PWM pulse signal having a desired duty generated by said DPWM generator and a PWM pulse signal having a preset fixed duty according to the result of detection by said transient variation detection means, said pair of power semiconductor switching components is driven by the PWM pulse signal selected by said selection means, and a common output capacitor is shared by said LC smoothing filters of said plural number of power supply units, wherein said transient variation detection means is a window comparator provided at an output end of the digital control switching power-supply device and compares the output voltage of the digital control switching power-supply device with upper and lower limit values preset around a reference voltage set to provide the output voltage and supplies the comparison result to said selection means, said selection means receives said comparison result as a selection signal and selects from among said PWM pulse signals based on said comparison result, and the digital control switching power-supply device further comprises:

a maximum value memory circuit that determines the difference signal between a digital signal obtained by A/D-converting the output voltage of a CR filter provided across an inductor L of said LC smoothing filter and a digital output voltage signal obtained by A/D-converting the output voltage of the digital control switching power-supply unit and selects and memorizes the maximum value of plural number of difference signals generated by the power supply units; and means for generating a compensation digital reference voltage signal by adding, to said digital reference voltage value, the difference value between the maximum difference signal value memorized in said maximum value memory circuit and the difference signal between the digital signal obtained by A/D-converting the output voltage of said CR filter of each power supply unit and the digital output voltage signal obtained by A/D-converting the output voltage of the digital control switching power-supply device.

15. A digital control switching power-supply device having a plural number of power supply units, wherein each power supply unit comprises:

a pair of power semiconductor switching components driven by the PWM pulse signal;

an LC smoothing filter that converts a square wave voltage resulting from switching of said pair of power semiconductor switching components into a direct current;

a digital signal processing section having digital voltage control means that performs control so that the difference signal between a digital voltage signal obtained by digitizing a fed-back output voltage of a CR filter for transient variation detection provided across an inductor L of said LC smoothing filter and the digital reference voltage signal obtained by digitizing the reference voltage of a command signal becomes zero and a digital pulse width modulation (DPWM) generator that generates a pulse width modulation (PWM) pulse signal;

transient variation detection means that detects a transient variation at the time of a sudden load change, wherein the transient variation detection means includes said CR filter and a transient variation detection circuit having a window comparator, provided at an output terminal of the CR filter, for comparing an output voltage of said CR filter with upper and lower limit values preset around a reference voltage corresponding to an analog value to which said digital reference voltage signal is converted, to generate a comparison result and wherein said transient variation detection circuit is provided in parallel with said digital signal processing section and outputs the comparison result; and selection means that selects any of a PWM pulse signal having a desired duty generated by said DPWM generator and a PWM pulse signal having a preset fixed duty according to the result of detection by said transient variation detection means, wherein said selection means selects and outputs a PWM pulse signal having a preset fixed duty of 100% which is preset irrespective of a PWM pulse signal generated by said DPWM generator in said digital signal processing section in case where said transient variation detection means detects that said output voltage of said CR filter becomes lower than said preset lower limit value, wherein said selection means selects and outputs a PWM pulse signal having a fixed duty of 0% which is preset irrespective of the PWM pulse signal generated by said DPWM generator in said digital signal processing section in case where said transient variation detection means detects that said output voltage of said CR filter becomes higher than said preset upper limit value and wherein said selection means selects and outputs said PWM pulse having said desired duty generated by said DPWM generator in said digital signal processing section in other cases, wherein said pair of power semiconductor switching components is driven by the PWM pulse signal selected and outputted by said selection means, and wherein a common output capacitor is shared by said LC smoothing filters of said plural number of power supply units.

16. A digital control switching power-supply device, comprising:

a pair of power semiconductor switching components driven by the PWM pulse signal;

an LC smoothing filter that converts a square wave voltage resulting from switching of said pair of power semiconductor switching components into a direct current;

a digital signal processing section having digital voltage control means that performs control so that the difference signal between a digital voltage signal obtained by digitizing a fed-back output voltage of a CR filter for transient variation detection provided across an inductor L of said LC smoothing filter and the digital reference voltage signal obtained by digitizing the reference voltage of a command signal becomes zero and a digital pulse width modulation (DPWM) generator that generates a pulse width modulation (PWM) pulse signal;

transient variation detection means that detects a transient variation at the time of a sudden load change, wherein the transient variation detection means includes said CR filter and a transient variation detection circuit having a window comparator, provided at an output terminal of the CR filter, for comparing an output voltage of said CR filter with upper and lower limit values preset around a reference voltage corresponding to an analog value to which said digital reference voltage signal is converted, to generate a comparison result and wherein said transient variation detection circuit is provided in parallel with said digital signal processing section and outputs the comparison result; and selection means that selects any of a PWM pulse signal having a desired duty generated by said DPWM generator and a PWM pulse signal having a preset fixed duty according to the result of detection by said transient variation detection means, wherein said selection means selects and outputs a PWM pulse signal having a preset fixed duty of 100% which is preset irrespective of a PWM pulse signal generated by said DPWM generator in said digital signal processing section in case where said transient variation detection means detects that said output voltage of said CR filter becomes lower than said preset lower limit value, wherein said selection means selects and outputs a PWM pulse signal having a fixed duty of 0% which is preset irrespective of the PWM pulse signal generated by said DPWM generator in said digital signal processing section in case where said transient variation detection means detects that said output voltage becomes higher than said preset upper limit value of said CR filter and wherein said selection means selects and outputs said PWM pulse having said desired duty generated by said DPWM generator in said digital signal processing section in other cases, wherein said pair of power semiconductor switching components is driven by the PWM pulse signal selected and outputted by said selection means, and wherein one of commercially available processing components including a DSP core, a processor and special-purpose hardware is used in said digital signal processing section, and said transient variation detection means and said selection means are provided externally to said processing component.

17. Information processing equipment having a power-supply device, a CPU and a memory that receive a direct-current voltage from the power-supply device, and a hard disk drive that memorize information in the memory, wherein said power-supply device functions as a buck-type DC-DC converter that receives a DC input voltage at an input terminal and outputs a lowered DC output voltage at an output terminal, and said power-supply device comprises:

a pair of power semiconductor switching components driven by the PWM pulse signal;

an LC smoothing filter that converts a square wave voltage resulting from switching of said pair of power semiconductor switching components into a direct current;

a digital signal processing section having digital voltage control means that performs control so that the difference signal between a digital voltage signal obtained by digitizing a fed-back output voltage of a CR filter for transient variation detection provided across an inductor L of said LC smoothing filter and the digital reference voltage signal obtained by digitizing the reference voltage of a command signal becomes zero and a digital pulse width modulation (DPWM) generator that generates a pulse width modulation (PWM) pulse signal;

transient variation detection means that detects a transient variation at the time of a sudden load change, wherein the transient variation detection means includes said CR filter and a transient variation detection circuit having a window comparator, provided at an output terminal of the CR filter, for comparing an output voltage of said CR filter with upper and lower limit values preset around a reference voltage corresponding to an analog value to which said digital reference voltage signal is converted, to generate a comparison result and wherein said transient variation detection circuit is provided in parallel with said digital signal processing section and outputs the comparison result; and selection means that selects any of a PWM pulse signal having a desired duty generated by said DPWM generator and a PWM pulse signal having a preset fixed duty according to the result of detection by said transient variation detection means, wherein said selection means selects and outputs a PWM pulse signal having a preset fixed duty of 100% which is preset irrespective of a PWM pulse signal generated by said DPWM generator in said digital signal processing section in case where said transient variation detection means detects that said output voltage of said CR filter becomes lower than said preset lower limit value, wherein said selection means selects and outputs a PWM pulse signal having a fixed duty of 0% which is preset irrespective of the PWM pulse signal generated by said DPWM generator in said digital signal processing section in case where said transient variation detection means detects that said output voltage value becomes higher than said preset upper limit value of said CR filter and wherein said selection means selects and outputs said PWM pulse having said desired duty generated by said DPWM generator in said digital signal processing section in other cases, wherein said pair of power semiconductor switching components is driven by the PWM pulse signal selected and outputted by said selection means and said DC output voltage is generated by lowering said DC input voltage.

* * * * *